(12) United States Patent
Nakagome et al.

(10) Patent No.: US 8,134,657 B2
(45) Date of Patent: Mar. 13, 2012

(54) OPTICAL COMPONENT, LIGHTING DEVICE AND DISPLAY DEVICE

(75) Inventors: Tomohiro Nakagome, Tokyo (JP); Yuki Igarashi, Tokyo (JP); Kazuyoshi Ebina, Tokyo (JP); Hidenori Echizen, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 13/153,260

(22) Filed: Jun. 3, 2011

(65) Prior Publication Data
US 2011/0234942 A1 Sep. 29, 2011

Related U.S. Application Data

(63) Continuation of application No. PCT/JP2009/070351, filed on Dec. 3, 2009.

(30) Foreign Application Priority Data

| Dec. 5, 2008 | (JP) | ................................. 2008-311459 |
| Jan. 9, 2009 | (JP) | ................................. 2009-003774 |
| Feb. 20, 2009 | (JP) | ................................. 2009-038380 |
| Jul. 15, 2009 | (JP) | ................................. 2009-167127 |
| Sep. 24, 2009 | (JP) | ................................. 2009-218789 |

(51) Int. Cl.
G02F 1/1333 (2006.01)
G02F 1/1335 (2006.01)

(52) U.S. Cl. .............. 349/64; 349/60; 349/65; 359/618; 359/620

(58) Field of Classification Search .............. 349/60–65, 349/95, 96; 359/618–620
See application file for complete search history.

(56) References Cited

U.S. PATENT DOCUMENTS

| 5,870,224 A | * | 2/1999 | Saitoh et al. | ................... 359/456 |
| 5,995,286 A | * | 11/1999 | Mukai et al. | ................... 359/571 |
| 6,021,003 A | * | 2/2000 | Katsuki et al. | ................. 359/619 |
| 6,075,652 A | * | 6/2000 | Ono et al. | ....................... 359/642 |
| 7,777,831 B2 | * | 8/2010 | Kim et al. | ......................... 349/62 |

FOREIGN PATENT DOCUMENTS

| JP | 2004-006256 | 1/2004 |
| JP | 2008-070456 | 3/2008 |
| JP | 2010-044379 | 2/2010 |

* cited by examiner

*Primary Examiner* — Huyen Ngo
(74) *Attorney, Agent, or Firm* — Squire, Sanders & Dempsey (US) LLP

(57) ABSTRACT

One embodiment of the present invention is an optical component, including a first main surface and a second main surface wherein a plurality of two-dimensionally arranged first convex parts are arranged on the first main surface, each of the first convex parts being independent and an aspherical micro lens having an approximate semispherical shape or an approximate elliptic semispherical shape, or having a rounded tip, and a plurality of second convex parts of the height of which is lower than the height of the plurality of the first convex parts, the second convex parts comprising a lens extending in a one dimensional direction, the lens being arranged in one or two directions.

6 Claims, 21 Drawing Sheets

Area ratio Mc/Ma

| Aspect ratio TM3/PM3 | 1% | 2% | 3% | 5% | 10% | 15% | 20% |
|---|---|---|---|---|---|---|---|
| 0.05 | 0.0% | 0.0% | -0.3% | -1.0% | -1.5% | -2.5% | -3.8% |
|  | 0% | +1% | +2% | +4% | +5% | +8% | +11% |
| 0.1 | 0.0% | -0.5% | -0.5% | -1.2% | -2.0% | -3.3% | -4.2% |
|  | +2% | +3% | +4% | +5% | +8% | +12% | +15% |
| 0.2 | -0.5% | -0.8% | -1.0% | -1.5% | -3.3% | -4.0% | -5.5% |
|  | +2% | +3% | +6% | +8% | +13% | +16% | +18% |
| 0.3 | -0.5% | -1.0% | -1.3% | -1.8% | -4.2% | -5.8% | -7.0% |
|  | +3% | +4% | +6% | +9% | +16% | +20% | +22% |
| 0.4 | -0.8% | -1.2% | -1.7% | -2.3% | -4.8% | -6.5% | -9.2% |
|  | +4% | +5% | +8% | +13% | +20% | +22% | +24% |
| 0.5 | -1.0% | -1.5% | -2.5% | -3.8% | -5.3% | -8.2% | -11.2% |
|  | +5% | +7% | +12% | +18% | +22% | +23% | +24% |
| 0.55 | -1.8% | -2.6% | -4.1% | -5.5% | -8.3% | -12.5% | -17.2% |
|  | +5% | +9% | +14% | +20% | +23% | +24% | +26% |

Fig. 10

OPTICAL COMPONENT, LIGHTING DEVICE AND DISPLAY DEVICE

CROSS REFERENCE TO RELATED APPLICATION

This application is a continuation of International Application No. PCT/JP2009/070351, filed on Dec. 3, 2009, the entire contents of which are incorporated herein by reference.

BACKGROUND OF THE INVENTION

1. Field of the Invention

The present invention is related to an optical component used for controlling a path of light, the optical component collecting light or diffusing light. The present invention is related mainly to a lighting device using this optical component and display device with the lighting device such as a liquid crystal television.

2. Description of the Related Art

In a recent large size liquid crystal television or a flat display panel, a direct-lit type lighting device and an edge light type lighting device are adopted. In a direct-lit type lighting device, a plurality of cold cathode fluorescent lamps or LEDs (Light Emitting Diodes) are regularly arranged in a rear surface of a panel as a light source. A diffusion plate having a strong light scattering property is used between an image display element such as a liquid crystal panel and a light source and thereby cold cathode fluorescent lamps or LEDs can not be viewed. On the other hand, in an edge light type lighting device, a plurality of cold cathode fluorescent lamps or LEDs are arranged at an end surface of a transparent plate which is called a light guiding plate. Generally, a light deflection surface is formed at a surface opposite to a light outgoing surface (which faces an image display element) of a light guiding plate, the light deflection surface efficiently guiding light entering from an end surface of the light guiding plate toward a light outgoing surface. Proposed light deflection surfaces are, for example, a component on which a white dot pattern is printed or a component on which a lens shape is provided, these having the purpose of efficiently guiding light toward a light outgoing surface.

Conventionally, in a direct-lit type and an edge light type lighting device, one or a plurality of optical films are arranged in order to improve brightness toward an observer of a display device.

A Brightness Enhancement Film (BEF, a registered mark of 3M (USA)) is widely used as a lens sheet as a means for improving brightness of a liquid crystal display screen. FIGS. 15-17 show a brightness enhancement film described in the following patent documents 1 and 2. In a liquid crystal display device 100 shown in FIG. 15, roughly, a light source 101, a BEF 102 as a bright enhancement film through which light emitted from a light source 101 passes and a liquid crystal panel 103 are arranged. As shown in FIG. 16, a BEF is an optical film in which unit prisms 105 having a cross sectional triangle shape are periodically arranged in one direction on a transparent base 104. This unit prism 105 has a larger size (pitch) compared with a wavelength of light.

A BEF 102 can collect light from "off-axis", and redirect the light to the observer "on-axis" or "recycle" the light. That is, a BEF 102 can increase brightness on axis by reducing brightness off-axis when a liquid crystal display device 100 is used (viewed). Here, "on-axis" is a direction corresponding to a viewing direction F by an observer in FIG. 15, and is generally a side of a direction of a normal line to a display screen of a liquid crystal panel 103.

Further, in a display device described in a patent document 2, a light diffusion film is arranged between a lens sheet in which prisms are arranged in one direction and a liquid crystal panel, while a transparent convex shape dot is formed on a light ingoing surface of a lens sheet and thereby brightness can be improved and moiré interference between regularly arranged lenses and a liquid crystal pixel can be prevented.

A large number of display panels as shown in the following patent documents 1 and 2 are known as a display device in which a brightness controlling component is arranged between a light source and a liquid crystal panel, the brightness controlling component having a repetitive array structure of a prism represented by the above BEF 102. In the case where a BEF 102 is adopted, it becomes possible for a display designer to achieve desirable brightness on axis while reducing power consumption. In an optical sheet in which a BEF 102 is used as a brightness controlling component, light from a light source finally emits from a light outgoing surface at a controlled angle due to refractive function. Thereby it is possible to strengthen the intensity of light toward a viewing direction by an observer. On the other hand, recently, a micro lens sheet as shown in patent document 3 is frequently adopted. A micro lens sheet shown in patent document 3 is a sheet in which an approximately semispherical micro lens is irregularly arranged on a transparent base as shown in FIG. 18. In the micro lens sheet, problems such as a side lobe generated in a prism sheet and moiré interference as mentioned above do not occur. Its visual characteristics are similar to the visual characteristics of a surface diffusion sheet and its front brightness is higher than the front brightness of a surface diffusion sheet.

Patent document 1: JP-A-H10-506500
Patent document 2: JP-A-H06-102506
Patent document 3: JP-A-2006-301582

However, in the case where a BEF 102 described in patent documents 1 and 2 is used, at the same time, a useless component of light due to reflection/refraction may be emitted toward a direction outside the viewing direction F' of an observer. Regarding the light intensity distribution to the angle taken respect to the observer's viewing angle shown in FIG. 17, a broken line B shows a light intensity distribution of a BEF 105. In this case, light intensity in the case where an angle with respect to a viewing direction F' is 0 degrees (which corresponds to a direction on axis) is highest. However, a small light intensity peak (a side lobe) is generated at an angle of 90 degrees with respect to a viewing direction F'. This side lobe is outside of a light path in a viewing direction and is uselessly emitted in a horizontal direction. Such an intensity distribution having a light intensity peak of a side lobe is not desirable and a smooth brightness distribution without a light intensity peak at ±90 degrees which is shown by a solid line A in FIG. 17 is desirable.

In addition, if brightness only on axis is excessively improved, a width of a peak of a curve of a brightness distribution becomes remarkably narrow and thereby a viewing region is extremely limited. Therefore, a light diffusion film which is different from a prism sheet has to be additionally used in order to appropriately broaden a width of a peak and remove moiré interference generated between periodical prisms and pixels. This increases the number of components, which is a problem. Further, since a prism sheet represented by a BEF 105 has a sharp top, a prism sheet is easily damaged in an assembling process or by friction with a light diffusion film, which has been previously been indicated as a problem. In addition, a micro lens sheet described in patent document 3 is less bright than a prism sheet and it was difficult for the micro lens sheet to be used for a backlight unit or a display device, which requires high brightness.

SUMMARY OF THE INVENTION

The present invention is made, considering the above problems, and provides the following. It is a purpose of the present invention to provide an optical component in which abrasion-resistance is improved without significantly reducing brightness, it is also a purpose to provide an optical component in which a side lobe is hardly generated and brightness to an observer is improved, and further it is also a purpose to provide a lighting device with the optical component and a display device with the lighting device.

A first aspect of the present invention is an optical component, including a first main surface and a second main surface, wherein a plurality of two-dimensionally arranged first convex parts are arranged on the first main surface, the first convex parts being independent of each other, and irregularly arranged, each of the first convex parts being a micro lens having an approximately semispherical shape or an approximately elliptical semispherical shape or an aspherical shape having a rounded tip; an aspect ratio TM1/PM1 of each of the first convex parts is equal to or more than 40% wherein a height of each of the first convex parts is defined as TM1 and a diameter of each of the first convex parts is defined as PM1; and a plurality of second convex parts arranged on the first main surface, each of the second convex parts having a height less than that of each of the first convex parts, each of the second convex parts comprising a lens extending in a one dimensional direction, the lens being arranged in one or two directions; a width of each of the first convex parts contacting with the first main surface is from 1.1 to 10 times as large as a width of each of the second convex parts; and an area ratio Mb/Ma is equal to or greater than 50% and equal to or lower than 88% wherein an area of the first main surface is defined as Ma and a total area of the first convex parts is defined as Mb.

A second aspect of the present invention is the optical component according to the first aspect, wherein the height of the second convex parts is from 10 to 90% of the height of the first convex parts.

A third aspect of the present invention is the optical component according to the first aspect, wherein the first convex parts are irregularly arranged on the first main surface, and wherein total areas of the first convex parts in contact with the first main surface per unit area of the first main surface are approximately constant with respect to location on the first main surface, wherein the first convex parts are included in the unit areas of the first main surface.

A fourth aspect of the present invention is the optical component according to claim 1, wherein the aspect ratio TM1/PM1 is equal to or greater than 40 to equal to or less than 90%.

An fifth aspect of the present invention is a lighting device, including the optical component according to the first aspect, and a light source irradiating the optical component from a side of the second main surface.

An sixth aspect of the present invention is a display device, including: an image display device which determines a display image according to transmission or shielding of light for a pixel unit; and the lighting device according to the fifth aspect.

BRIEF DESCRIPTION OF THE DRAWINGS

FIG. 10 is a table showing a relationship between a side lobe reduction ratio and brightness reduction due to a third convex part.

1 . . . a display device; 2 . . . a liquid crystal panel; 3 . . . a lighting device; 5 . . . a reflection plate; 6 . . . a light source; 7 . . . a diffusion plate; 8 . . . an optical component; 13 . . . a base; 13a . . . a first main surface; 13b . . . a second main surface; 14 . . . a first convex part (a micro lens); 15 . . . a second convex part (a prism lens); 18 . . . a third convex part (a micro lens); 28 . . . an optical sheet; 100 . . . a liquid crystal display device; 101 . . . a light source; 102 . . . a BEF; 103 . . . a liquid crystal panel; 104 . . . a transparent base; 105 . . . a unit prism; 113 . . . a micro lens; 117 . . . a base; A and B . . . distributions of light; F . . . a direction of a viewer: H and K . . . light; L . . . oblique incident light; p . . . light of a side lobe; q . . . a valley part: r . . . light to a front surface.

DETAILED DESCRIPTION OF THE INVENTION

Figure 1:
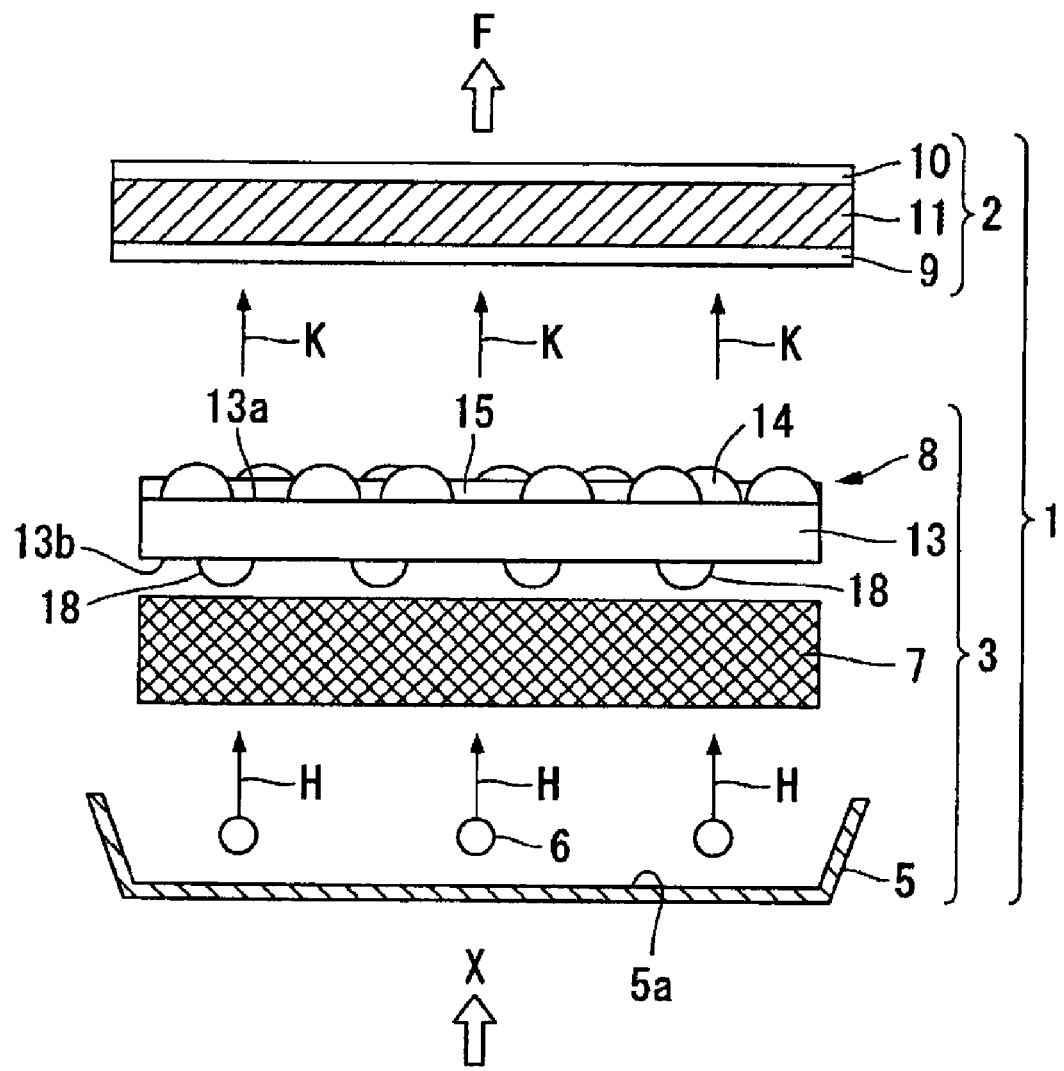
FIG. 1 is a schematic cross sectional diagram of a display device in a first embodiment of the present invention.

Hereinafter, embodiments of the present invention are explained. FIG. 1 is a schematic longitudinal cross sectional view showing an example of a lighting device with an optical component and a display device in a first embodiment of the present invention. A display device 1 in one embodiment of the present invention is comprised of a liquid crystal panel 2 as an image display device and a lighting device 3. A liquid crystal panel has polarizing plates (polarizing films) 9, 10 sandwiching a liquid crystal element 11. A liquid crystal device 11, for example, has two glass substrates wherein a liquid crystal layer is filled between the two glass substrates. Light K emitted from a backlight unit 3 enters the liquid crystal element 11 through the polarizing plate 9, and passes through the polarizing plate 10 toward a direction F of a viewer side. The liquid crystal element 11 of the liquid crystal panel 2 is a representative element displaying an image by transmitting/shielding light for each pixel unit and can improve an image quality compared with other display elements. In addition, manufacturing costs can be reduced.

In a lighting device 3 of an embodiment of the present invention, a plurality of light sources 6 are arranged in a lamp house 5 with a reflection plate 5a. In addition, a diffusion plate 7 in which light enters from the light source 6 and from which diffused light is emitted, and an optical component 8 of a first embodiment of the present invention are arranged in a direction of light emitted from the light source 6 (a direction F of a viewer side). Light H emitted from the light source 6 is diffused by the diffusion plate 7 which is then focused and/or diffused by the optical component 8 arranged on the diffusion plate 7 to become outgoing light K that enters the liquid crystal panel 2 and is emitted in the direction F of the viewer side.

As the light source 6, for example, a plurality of linear light sources or point light sources can be used. For example, a light source such as a plurality of fluorescent light tubes, cold cathode fluorescent lamps (CCFL) or external electrode fluorescent lamps (EEFL) can be used as a plurality of linear light sources. LED or the like can be used as a point light shape. The lamp house 5 is arranged in an opposite side of the plurality of light sources 6 to the direction F of the viewer side. The lamp house 5 has a reflection plate 5a. Light emitted in a direction of an opposite side to the direction F of the viewer side among light emitted in all directions from the light source 6 is reflected by the reflection plate 5a and is emitted in the direction F of the viewer side. As a result, light H emitted in the direction of the viewer side is almost the same as light emitted in all directions from the light source 6. Any component material can be used as a reflection plate 5a as long as the component material reflects light with high efficiency. For example, a generally used reflection film, reflection plate or the like can be used.

Figure 2:
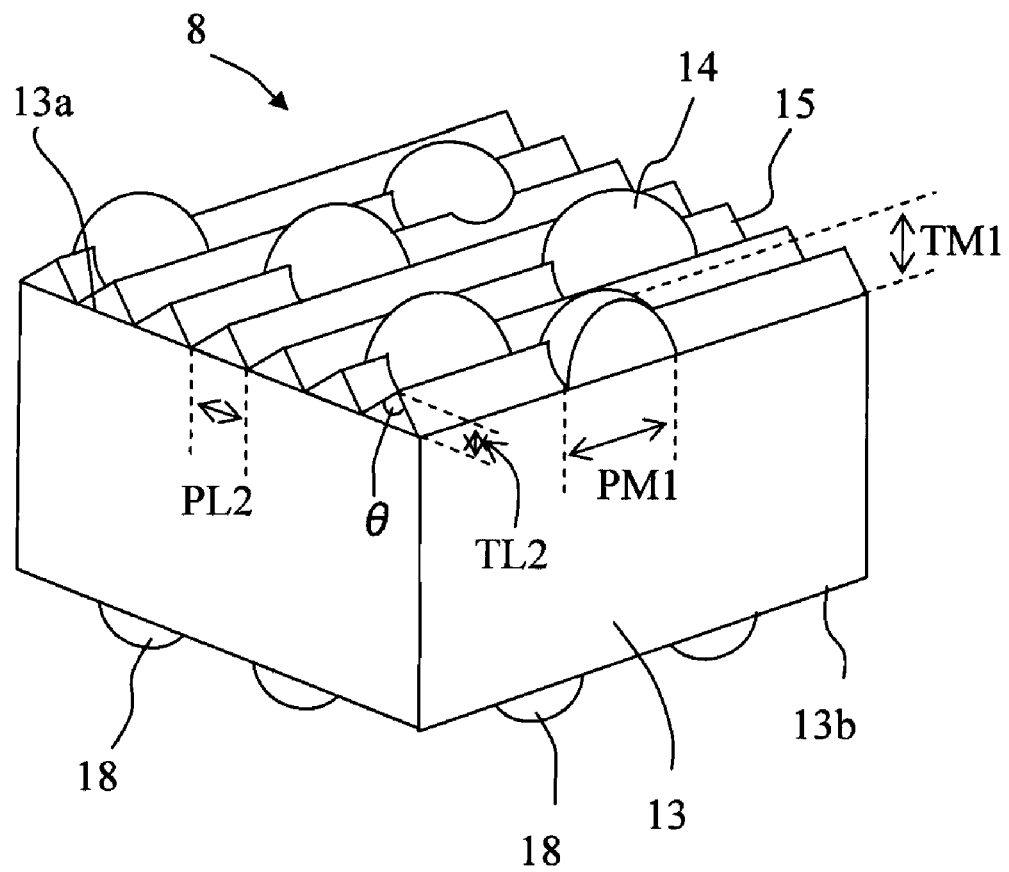
FIG. 2 is a perspective view of a main part of an optical component in the first embodiment of the present invention used for the display device shown in FIG. 1.

Next, an optical component 8 of a first embodiment is explained referring to FIG. 2. For example, approximate semispherical micro lenses 14 are scattered and formed as a first convex part on a partial region of one surface (a first main surface) 13a of a sheet-shaped transparent base 13. A plurality of columnar prism lenses 15 having a triangle shaped cross section are arranged and formed, as approximate columnar second convex parts extending in one dimensional direction, in an identical direction on the entire region of the surface 13a so as to fill a gap between the micro lenses 14. The micro lenses partially overlap with the prism lenses 15. Further, for example, micro lenses 18 are formed as a third convex part on a second main surface 13b. It is desirable that TL2/TM1 is from 10% to 90% wherein a height of the micro lens 14 is defined as TL1 is more than 90% of TM1, the influence of optical characteristics of the prism lens 15 is strong and thereby a side lobe is generated, which is not desirable. In addition, the difference in height between the micro lens 14 and the prism lens 15 is small and thereby the prism lens 15 easily scrapes against the liquid crystal panel 2, and thus abrasion resistance is reduced. Here, it is desirable that a diameter PM1 of the micro lens 14 is equal to or larger than 10 μm and equal to or shorter than 200 μm. In the case where PM1 is less than 10 μm, the diameter is too small and thereby it is difficult to manufacture the micro lens 14 with high accuracy. On the other hand, in the case where PM1 is more than 200 μm, the micro lens is too large and thereby the micro lens is easily viewed through a screen. Therefore, in the case where TL2/TM1 is less than 10%, the prism lens 15 is less than 1 μm at minimum and thereby influence of diffraction can not be ignored, which is not desirable. In addition, it is preferable that ratio PM1/PL2 is within 1.1 and 10 wherein a pitch of the prism lens is defined as PL2. In the case where PM1/PL2 is less than 1.1 (PM1 is almost the same as PL2, or, PL2 is larger than PM1), TL2 is equal to or higher than TM1, which is not desirable. This is because abrasion resistance is reduced. In addition, on the other hand, PM1 is always larger than PL2, and even if the micro lens 14 is arranged at an appropriate position of the first main surface 13a, the micro lens overlaps with two or more prism lenses 15. When the micro lens 14 overlaps with two or more prism lens 15, optical non-uniformity can be reduced. In particular, in the case where the micro lens completely overlaps with the prism lens, the overlapping region in the first main surface 13a becomes a unique point and the unique point is easily recognized as a point defect (local non-uniformity of brightness). Ideally, it is desirable that one micro lens 14 overlaps with three or more prism lenses 15. On the other hand, it is preferable that a rate where micro lenses 14, which is a first convex part, occupy an area of the first main surface 13a is 3% or more. In the case where the rate is less than 3%, micro lenses 14 are too few and therefore the micro lenses are recognized as defects by the eyes, which is not desirable. Further, micro lenses 14 having the rate of 3% or more are necessary in order to improve abrasion resistance of an optical component of the present invention.

Figure 3:
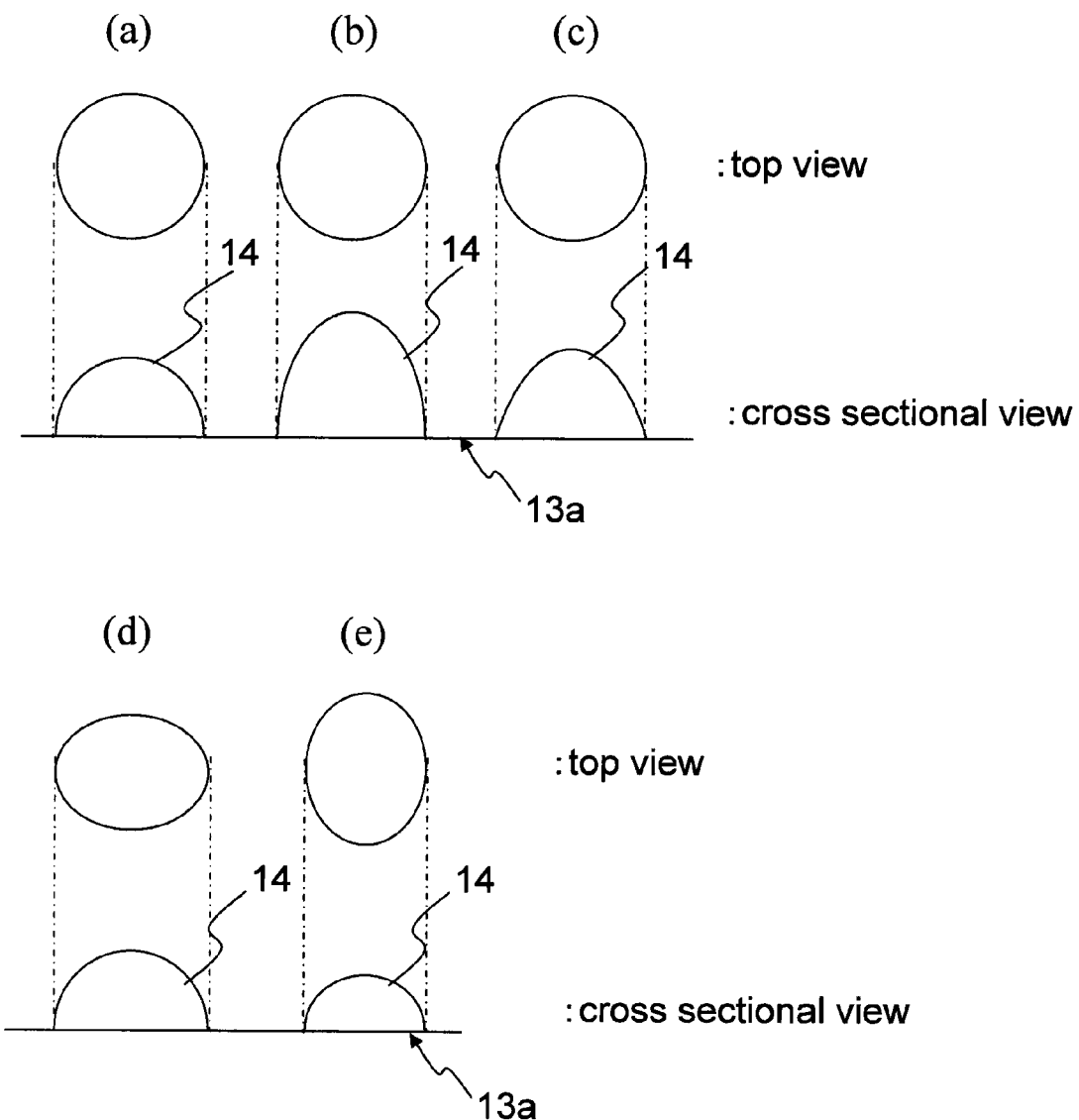
FIGS. 3 (a)-(e) are top views and cross sectional views of a first convex part forming an optical component of the present invention.

A micro lens having a cross section of an approximate elliptic semispherical shape as shown in FIG. 3(b) in addition to a micro lens having a cross section of an approximate semispherical shape as shown in FIG. 3(a) is exemplified as a first convex part. In addition, a micro lens having an aspherical shape and a rounded tip as shown FIG. 3(c) is exemplified. In the case where a shape of the micro lens is an approximate semispherical shape or an aspherical shape, light collecting performance can be improved compared with an approximate semispherical shape. In addition, a micro lens which has an approximate elliptic shape as shown in FIGS. 3(d), (e) can be also exemplified. In particular, if directions of long axis and directions of short axis of ellipsoids are aligned, directivity of emitted light can be adjusted. In the case where directions of long axis of ellipsoids are aligned in a horizontal direction as shown in FIG. 3(d), directivity in a vertical direction can be strong. In addition, in the case where directions of long axis of ellipsoids are aligned in a vertical direction as shown in FIG. 3(e), directivity of emitted light in a horizontal direction can be strong.

Figure 4:
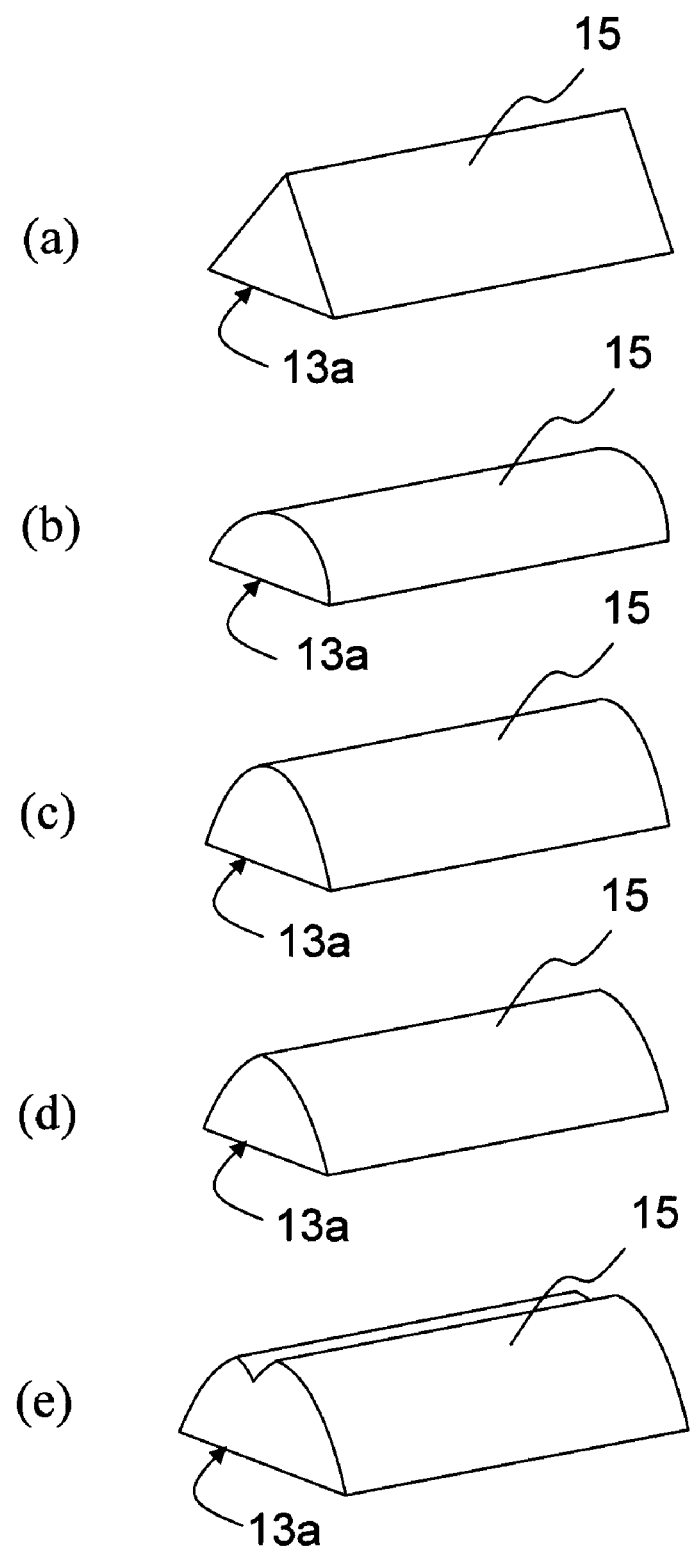
FIGS. 4 (a)-(e) are perspective views of a second convex part forming an optical component of the present invention.

On the other hand, a prism lens having a triangle shape cross section as shown in FIG. 4(a) is exemplified. An apex angle of the triangle shape is preferably from 70 degrees to 110 degrees for improving light collecting performance. More preferably, it is from 80 degrees to 100 degrees. Alternatively, a lenticular lens having a spherical shape or an aspherical shape cross section as shown in FIG. 4(b), (c) is exemplified. A lenticular lens has a low light collecting performance compared with a prism lens. However, a view field range can be broadened in order to improve diffusion performance, thus a lenticular lens is preferable. A shape satisfying the following formula 1 is desirable as a shape of the lenticular lens with a high light collecting performance and diffusion performance:

$$z = \frac{r^2/R}{1+\sqrt{1-(1+k)(r/R)^2}} + Ar^2 + Br^4 + Cr^6 \quad \text{[formula 1]}$$

Here, z is a position function in a direction of the height of the lenticular lens. r is a variable of a position in a direction of the width of the lenticular lens. Normalization is performed wherein a pitch of the lenticular lens is 1. In this case, respective coefficients, 1/R, A, B and C are preferably as follows. −10<1/R<10; −5<A<5; and −30<C<30. In the formula 1, it is more preferable that k=−1. In this case, the following are more preferable. −5<(1/(2R)+A)<5; −10<B<10; and −30<C<30. A lenticular lens which does not satisfy the above conditions has a light collecting performance and it is difficult to increase brightness of a lighting device which is an objective of the present invention, thus such a lenticular lens is not desirable.

On the other hand, a prism lens having a curved side surface is preferable. A triangle prism lens has a high light collecting performance while its diffusion performance is low. Thus, a curved prism lens having a balance between light collecting performance and diffusion performance is desirable. A curved prism lens is defined as a part of a curved side surface of a lenticular lens shape determined by formula 1. In this case, an angle between a tangent line to the top of the curved prism and a first main surface 13a is preferably 25-50 degrees. In the case where the angle is less than 25 degrees, light collecting performance is reduced. On the other hand, in the case where the angle is more than 50 degrees, light collecting performance is also reduced because a side lobe of a curved prism is very large. Here, the following are preferable. −10<1/R<10; −5<A<5; −10<B<10; and −30<C<30. Further, the following are preferable. k=−1; −5<(1/(2R)+A) <5; −10<B<10; and −30<C<30.

A second convex part as the above mentioned lens is possible to have a single shape or a plurality of shapes which are combined. The combined shape is formed by arranging lenses at a unit lens pitch or by making a combined shape in which the lens is shifted at a pitch which is less than a unit lens pitch as shown in FIG. 4(e). In the case of the combined shape in which the lens is shifted at a pitch which is less than a unit lens pitch, a side lobe which is generated in the case of a unit lens can be reduced without reducing brightness. The intersection of lenses is exemplified in order to improve brightness. In the case where lenses are intersected, for example, it is desirable that intersection at approximately right angles is performed. For example, a pyramid shape or an inverse pyramid shape lens is exemplified as a lens in which intersection at approximately right angles is performed.

In FIG. 2, it is desirable that an aspect ratio TM1/PM1 is 10-100% wherein PM1 is a diameter where the micro lens 14 contacts with the surface 13a of a base 13 and TM1 is the height of the micro lens 14 from the first main surface 13a. In the case where TM1/PM1 is less than 10%, the lens effects of light collecting or diffusion become very weak. In addition, on the other hand, in the micro lens 14 in which TM1/PM1 is more than 100%, light of a side lobe is increased and as a result light collecting performance is reduced. Therefore, it is preferable that an aspect ratio TM1/PM1 is 10-100%, more preferably 40-90%.

Figure 5:
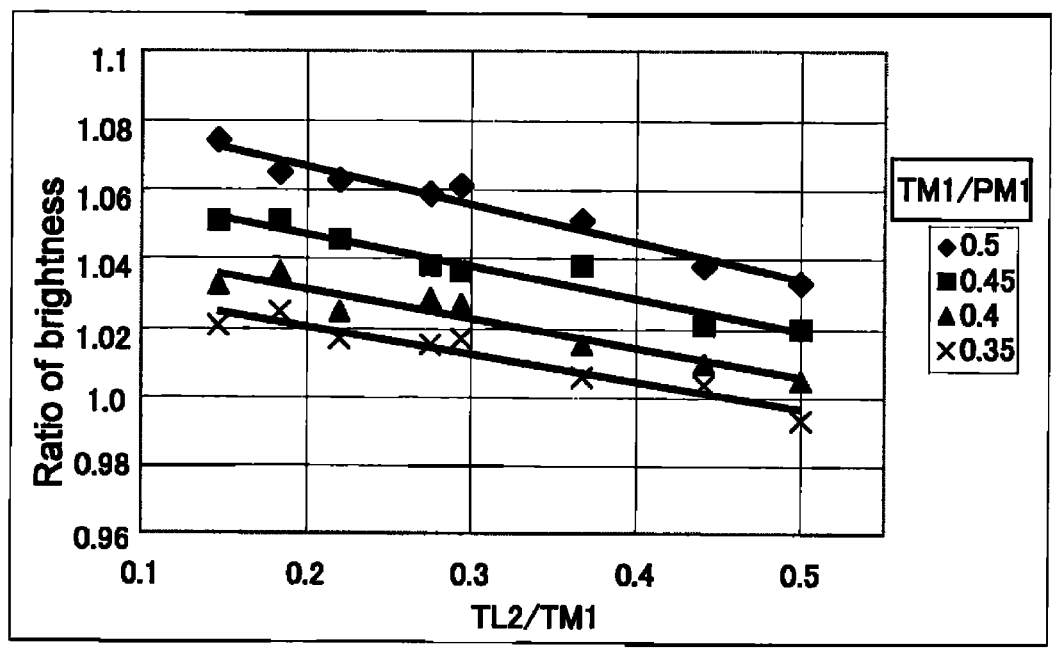
FIG. 5 is a graph showing a relationship between an aspect ratio of the first convex part, a height ratio of the first convex part and the second convex part, and brightness of an optical component of the present invention.
Figure 6:
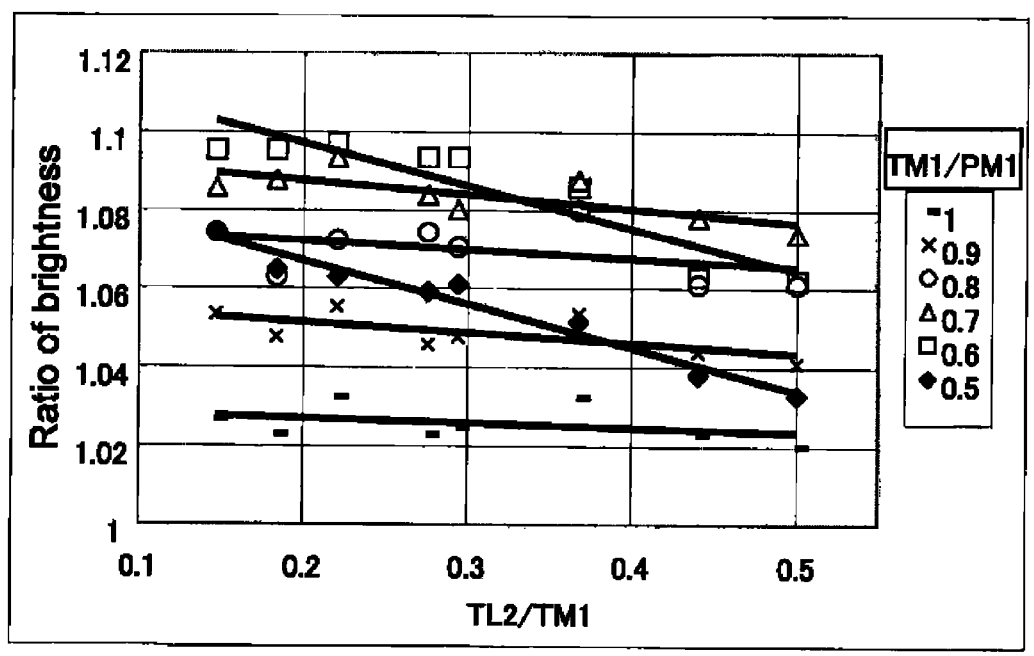
FIG. 6 is a graph showing a relationship between an aspect ratio of the first convex part, a height ratio of the first convex part and the second convex part, and brightness of an optical component of the present invention.
Figure 18:
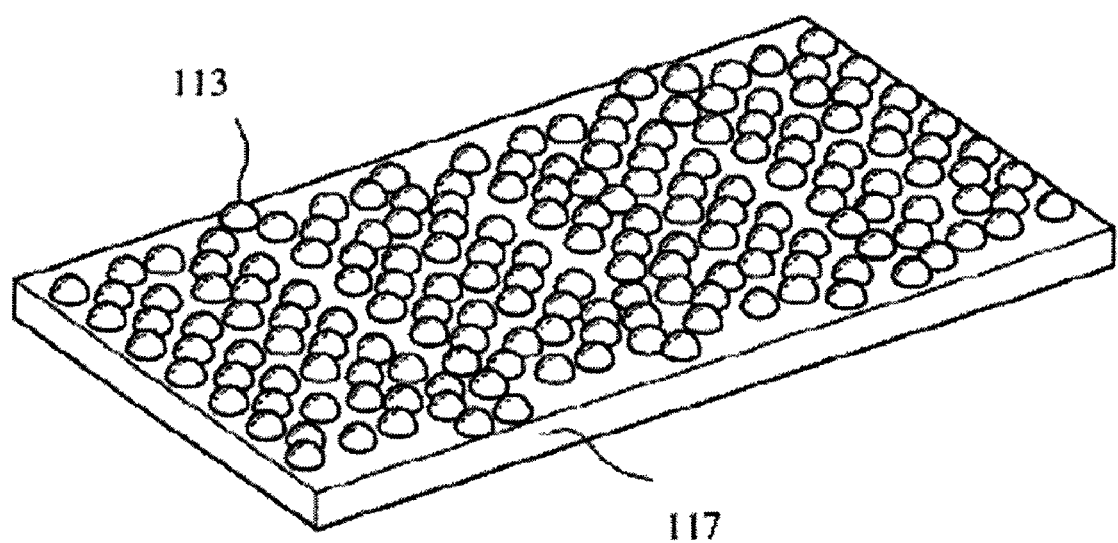
FIG. 18 is a perspective view of a micro lens sheet in a conventional example.

FIG. 5 is a graph showing brightness of an optical component 8 of the present invention in the case where an aspect ratio TM1/PM1 is 35-50%. FIG. 6 is a graph showing brightness of an optical component 8 of the present invention in the case where an aspect ratio TM1/PM1 is 50-100%. Here, the horizontal axis (TL2/TM1) of the graphs is a ratio between the height TM1 of the micro lens 14 which is a first convex part and the height TL2 of the prism lens 15 which is a second convex part. The vertical axis is a ratio of brightness. Here, the ratio of brightness 1.0 is the brightness of a micro lens sheet as shown in FIG. 18. In the micro lens sheet as shown in FIG. 18, micro lenses having diameters of 30 μm-100 μm are arranged on one surface of a base wherein the micro lenses occupy about 70-80% of an area of the surface.

The following results are shown from FIG. 5. In the case where TM1/PM1 is 35-50%, when TM1/PM1 becomes large, brightness is increased. In addition, in the case where TL2/TM1 is 0.5 or less, unless TM1/PM1 is 40% or more, a brightness higher than the brightness in the case of a micro lens sheet as shown in FIG. 18 can not be obtained. Therefore, it is desirable that TM1/PM2 is 0.4 or more.

On the other hand, the following results are shown from FIG. 6. Brightness is highest in the case where TM1/PM1 is 60-70%. Brightness is reduced in the case where TM1/PM1 is more than 60-70%. In the case where TM1/PM1 is 90%, when TL2/TM1 is 0.4-0.5, brightness is higher than brightness in the case where TM1/PM1 is 50% (semispherical shape). However, when TM1/PM1 is less than 0.4, brightness is lower than brightness in the case where TM1/PM1 is 50%. Therefore, it is desirable that TM1/PM1 is 40-90%. In the case where TM1/PM1 is 60-70%, the highest brightness is obtained.

Here, the prism lens 15 shown in this embodiment is formed as a triangle prism shape and thereby the effect of light collecting in a direction F of a viewer side becomes strong. Therefore, a highly bright display device 1 can be obtained. It is desirable that an apex angle θ of the prism lens 15 is from 70 to 110 degrees, more preferably from 80 to 100 degrees in order to obtain a highly bright display device 1. On the other hand, the triangle prism lens 15 has an effect in which light collecting in a direction F of an observer side is high, while a side lobe is generated. Thus, it is desirable that an area ratio Mb/Ma is 35-88% wherein Ma is an area of the first main surface 13a and Mb is a total area of the micro lens 14. Hereinafter, the reason why the range is preferable is explained.

Figure 7:
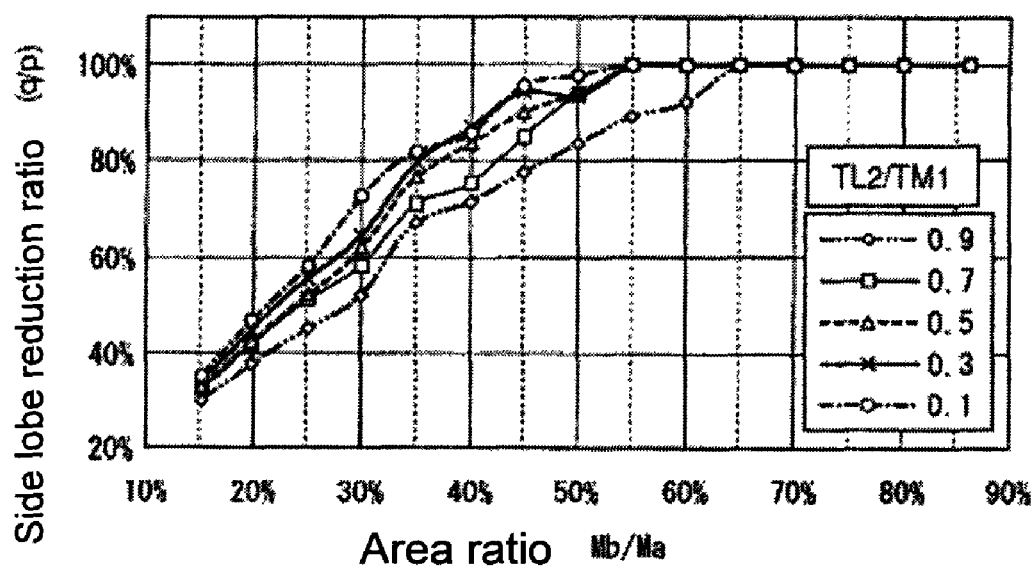
FIG. 7 is a graph showing a relationship between an area ratio and a side lobe reduction ratio of the first convex part.
Figure 16:
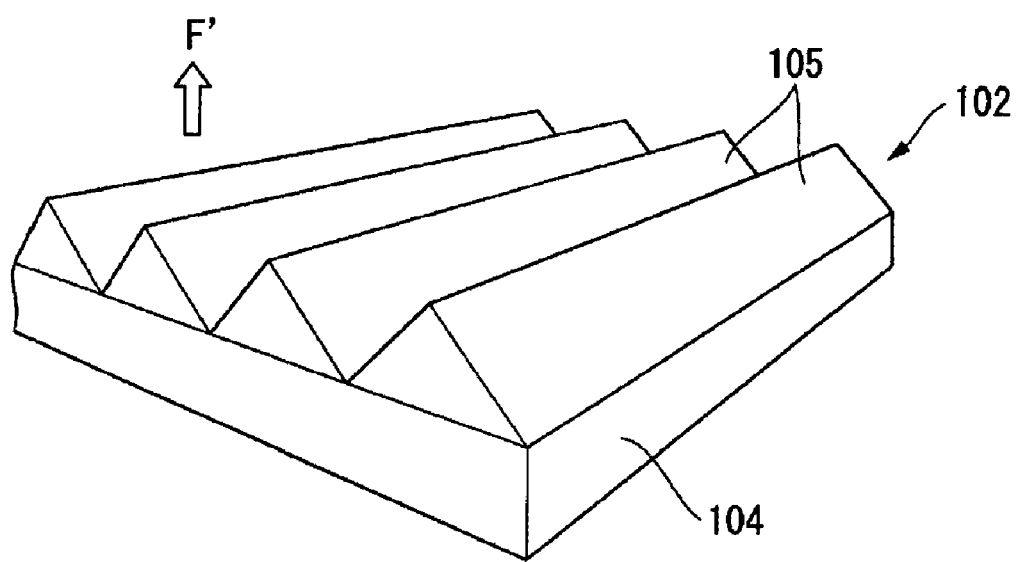
FIG. 16 is a perspective view of a BEF.
Figure 17:
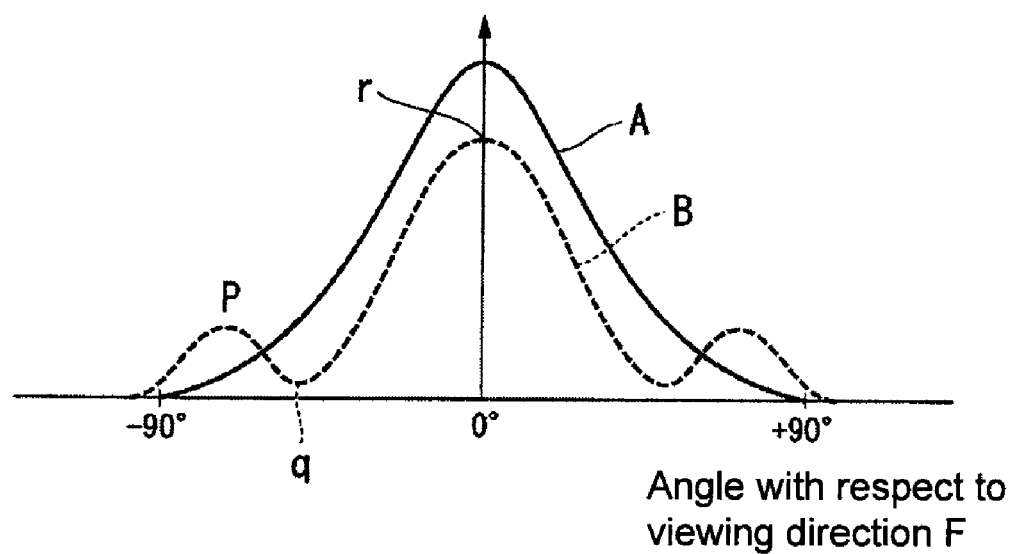
FIG. 17 is a graph showing a relationship between brightness of light and an angle from a viewing direction F.

FIG. 7 is a graph showing a relationship between an area ratio Mb/Ma and a side lobe reduction ratio in the case where TL2/TM1 has values from 0.1 to 0.9 at intervals of 0.2 (That is, TL2/TM1 has values of 0.1, 0.3, 0.5, 0.7 and 0.9.) when an apex angle θ of a prism lens 15 is 90 degrees. Here, a side lobe reduction ratio is q/p wherein p is a brightness peak of a side lobe and q is a brightness bottom in a valley between a brightness front peak r and the brightness peak p, assuming that the light brightness distribution of an optical component 8 is the brightness distribution shown by a broken line B in FIG. 17 of a conventional general display device 100 using a BEF 102 as shown in FIG. 16. That is, when q/p becomes small, a large side lobe and a valley are generated and the side lobe is viewed by a viewer (an observer). In contrast, if q/p is 100%, it is determined that there is no side lobe.

When an optical component 8 of this embodiment was actually incorporated in a display device 1 and was visually observed, in the case where q/p was 80% or more, influence of a side lobe was small so that the side lobe could not be visually observed and therefore a lower limit of (q/p) is determined to be 80%. As a result, in the case where Mb/Ma is less than 35%, influence of a side lobe due to the prism lens 15 is too strong. Thereby, q/r can not be 80% or more for optical components 8 wherein TL2/TM1 of the optical components have all values. On the other hand, Mb/Ma in the case where micro lenses 14 are closely arranged in a delta is theoretically about 91%. However, it is difficult to arrange micro lenses 14 without an error of 1 μm in view of a manufacturing process. After the study by the inventors of the present invention, it was determined that 88% is actually an upper limit. In addition, in FIG. 7, in the case where Mb/Ma is 50% or more, q/p was 80% or more regardless of a value of TL2/TM1.

Figure 8:
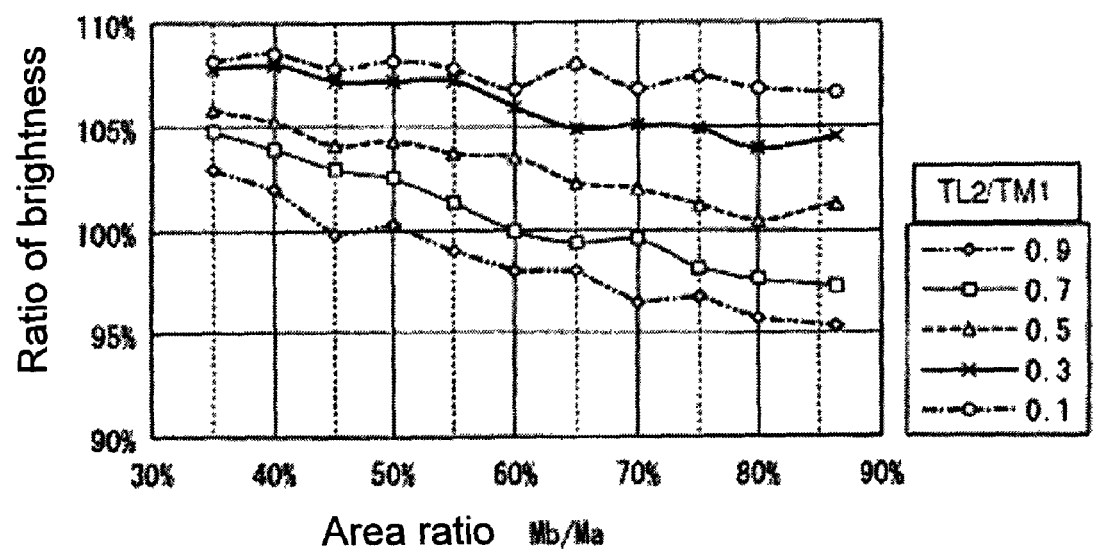
FIG. 8 is a graph showing a relationship between an area ratio of a first convex part, a height ratio of a first convex part and a second convex part, and brightness of an optical component of the present invention.

FIG. 8 is a graph showing a relationship between Mb/Ma and a ratio of brightness of an optical component 8 of the first embodiment. Here, a ratio of brightness is a value in the case where brightness of a micro lens sheet shown in FIG. 18 is defined as 100%. In addition, as mentioned above, if an area ratio is less than 35%, a side lobe is generated regardless of TL2/TM1. Therefore, here, in the case where Mb/Ma was 35% or more and TL2/TM1 was 0.1-0.9, evaluation was performed. FIG. 8 shows that if TL2/TM1 becomes large, brightness of an optical component 8 of the present invention becomes low. In particular, in the case where TL2/TM1 is 0.9, brightness is higher than the brightness of a micro lens sheet of FIG. 18 only when an area ratio is 35-50%.

Here, as shown in FIG. 7, in the case where TL2/TM1 is 0.9, if Mb/Ma is 45% or less, q/p is less than 80%. Therefore, considering the ratio of brightness shown in FIG. 8 and the side lobe reduction ratio shown in FIG. 7, a ratio of brightness of 100% or more and q/p of 80% or more are obtained only when Mb/Ma is 45-50%. From this result, it is more preferable that TL2/TM1 is less than 0.9. In addition, similarly, in the case where TL2/TM1 is 0.7, if Mb/Ma is more than 60%, a ratio of brightness is less than 100%. However, in the case where Mb/Ma is 35-60%, a ratio of brightness of 100% or more is obtained. Therefore, there is a sufficient acceptable value range in manufacturing an optical component 8, which is not a problem. Further, an optimum TL2/TM1 in which all ratios of brightness are 100% or more is 0.5 or less.

On the other hand, FIG. 8 shows that if Mb/Ma becomes small, brightness of an optical component 8 of the present invention becomes high. Further, inventors of the present invention found a method for improving a side lobe reduction ratio without significant loss of light collecting performance toward a front direction, in order to obtain a display device 1 of higher brightness.

Figure 9:
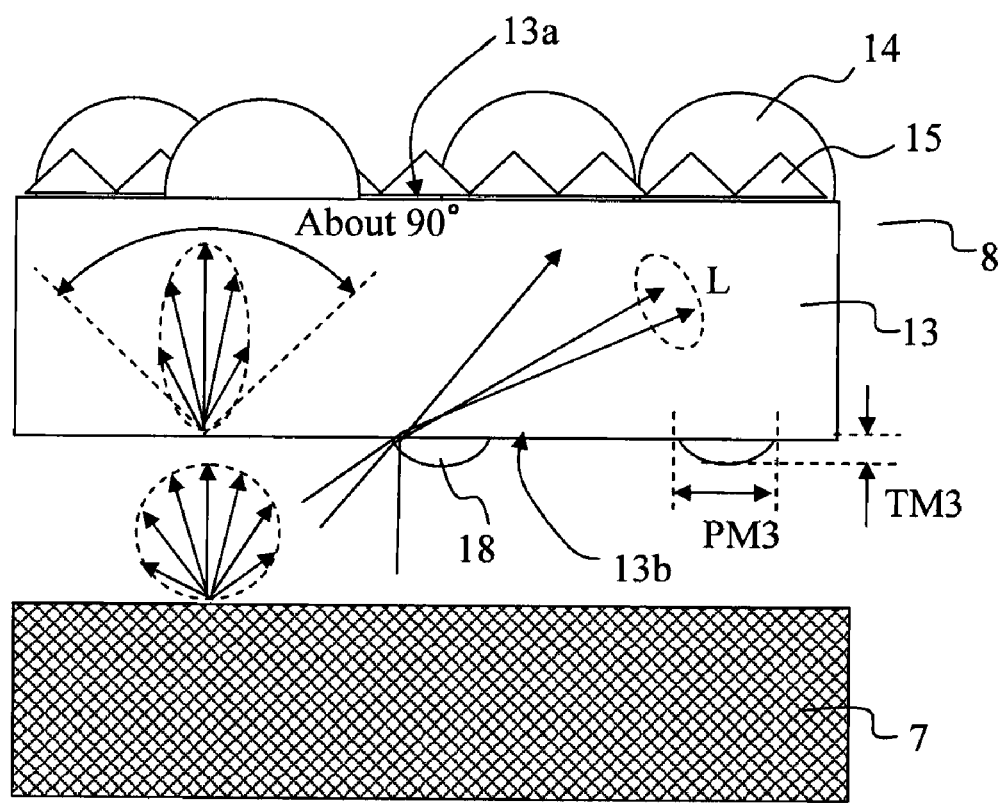
FIG. 9 is a figure showing directions of light from a third convex part.

That is, a plurality of transparent third convex parts 18 are arranged on a second main surface 13b of FIG. 2. These third convex parts 18 are, for example, arranged in random order, and preferably have a sloping side surface. In this embodiment, the third convex part 18 constitutes a micro lens of an approximately semispherical shape. Further, if Ma is an area of the second main surface 13b in a planar view and Mc is a total area of the plurality of third convex parts 18, an area ratio of a third convex part is defined as Mc/Ma. In this case, a side lobe reduction ratio can be improved without significant loss of light collecting performance toward a front direction. FIG. 9 shows a direction of light entering a second main surface in the case where micro lenses 18 are arranged on the second main surface 13b. In the case where the second main surface 13b is a flat surface, diffusion light emitted from diffusion plate 7, the diffusion light having intensity in directions with about 180 degrees of range which is defined by Lambert, enters a base 13, and is collected due to a difference in refractive index between air and the base 13.

Here, if a refractive index of the base 13 is temporally defined as 1.5 as a refractive index of a general glass or plastic material, diffusion light having intensity over 180 degrees range is focused within about 90 degrees. If a direction of a normal line of the base 13 is defined as 0 degrees, light having a range over ±45 degrees enters micro lenses 14 and prism lenses 15 formed on the first main surface 13a, and is emitted in a direction F of a viewer side due to functions such as refraction, reflection, transmission or the like. Here, in the case where micro lenses 18 are formed on the second main surface 13b, light having a range without ±45 degrees enters micro lenses 14 and prism lenses 15. The inventors found that this light (L: in FIG. 9) having a range without ±45 degrees has an effect in which a side lobe of the optical component 8 of the present invention is reduced. That is, a side lobe can be reduced by light L, the light L being of a larger angle than light which is limited due to a difference in refractive index between air and the base 13.

It is desirable that TM3/PM3×Mc/Ma is 0.5-4.5% wherein TM3 is the height of the micro lens 18 formed on the second main surface 13b, PM3 is a diameter of the micro lens 18 and Mc/Ma is an area ratio between the third convex part 18 and the second main surface. In a table shown in FIG. 10, the horizontal axis is Mc/Ma and the vertical axis is TM3/PM3. Values in the upper column of the table are reduction ratios of front brightness and values in the lower column are side lobe reduction ratios. If TM3/PM3 becomes large, a side lobe reduction ratio and a reduction ratio of front brightness become large at low Mc/Ma. Alternatively, if a side lobe reduction ratio becomes large, a reduction of front brightness becomes large. Therefore, it is necessary to determine a practical threshold which the inventors determined. That is, a reduction ratio of front brightness is 5% or less. One of the features of the optical component 8 of the present invention is that brightness is higher than the brightness of a micro lens sheet of FIG. 18. Therefore, if a reduction ratio of brightness is 5% or more, such a case is outside of the object of the present invention. On the other hand, a lower limit of a side lobe reduction ratio is determined to be 5%. In the case where a side lobe reduction ratio is 5% or less, its effect is small and forming the third convex part 18 on the second main surface 13b means little.

On the other hand, in the case where the third convex part 18 is arranged on the second main surface 13b, it is necessary to consider not only its optical characteristics but also formability or appearance of the third convex part 18. In the case where TM3/PM3 is less than 10%, TM3 becomes very small, thus non-uniformity of diameter or height easily occurs. In addition, a slope on a side surface of the third convex part 18 is small and optical characteristics thereof become almost the same as optical characteristics of a flat surface. Therefore, light L entering micro lenses 14 and prism lenses 15 formed on the first main surface 13a does not have so large an angle. Therefore, Mc/Ma must be very large in order to increase a side lobe reduction rate. On the other hand, if TM3/PM3 is too high, an angle of light L becomes large. In addition, since rays of light L are increased, light collecting performance toward a front direction is reduced. Therefore, it is necessary to reduce Mc/Ma. However, if Mc/Ma is too small, non-uniformity is easily viewed. The inventors of the present invention visually observed third convex parts 18 having various Mc/Ma. As a result, it is determined that Mc/Ma of 3-10% is suitable. From these results, it is desirable that TM3/PM3 is 10-40%. In the case of the range, brightness reduction can be 5% or less while a side lobe reduction ratio can be increased by 5-20%. Therefore, in an optical component 8 of the present invention, micro lenses 14 and prism lenses 14 are formed on the first main surface 13a, and third convex parts 18 are formed on the second main surface 13b, an aspect ratio of each of the third convex parts 18 being 0.1-0.4 and an area ratio of the third convex parts 18 being 3-10%. A side lobe reduction ratio is increased by 20% at most due to the third convex part 18 formed on the second main surface 13b. Therefore, an area ratio Mb/Ma is preferably 25% or more.

In the optical component 8 of the present invention, it is desirable that the first convex part 14 and the third convex part 18 are a micro lens having an approximately semispherical shape. In addition, the first convex part 14 and the third convex part 18 may be regularly arranged on the first main surface 13a and the second main surface 13b. However, if the first convex part 14 and the third convex part 18 are regularly arranged, moiré fringes are generated due to regularly arranged second convex parts 15. Therefore, it is desirable that the first convex part 14 and the third convex part 18 are irregularly arranged. However, even if the first convex part 14 and the third convex part 18 are irregularly arranged, if there is variation of the respective total areas of contacting area between the first convex part 14 and the third convex part 18 with the first main surface 13a and the second main surface 13b per unit area, non-uniformity is viewed by a viewer. Therefore, it is desirable that the first convex part 14 and the third convex part 18 are irregularly arranged and "respective total areas of respective surfaces where the first convex part 14 and the third convex part 18 respectively contacts with the first main surface 13a and the second main surface 13b" per unit area of the first main surface 13a and the second main surface 13b are approximately constant at any part of the first main surface 13a and the second main surface 13b. Here, each of the unit areas means an area in which surface areas of the first main surface 13a and the second main surface 13b are respectively divided into 10-100 pieces. "Approximately constant" means that a total of "an area in which the first convex part 14 or the third convex part 18 contact with the first main surface 13a or the second main surface 13b" per unit area is within approximately an average value±15%.

Next, other structures of the lighting device 3 and the display device 1 in this embodiment are further explained. A diffusion plate 7 is comprised of a transparent resin in which a light diffusion area is dispersed. A transparent resin is, for example, a thermoplastic resin, a thermosetting resin or the like. For example, polycarbonate resin, acrylic resin, fluorine system acrylic resin, silicone system acrylic resin, epoxy acrylate resin, polystyrene, cyclo-olefin polymers, methyl styrene resin, fluorene resin, polyethylene terephthalate (PET), polypropylene, acrylonitrile styrene copolymer, acrylonitrile polystyrene copolymer or the like can be used. It is preferable that a light diffusion region dispersed in a transparent resin is comprised of a light diffusion particle in diffusion plate 7. This is because a preferable diffusion performance can be easily obtained.

A transparent particle made of an inorganic oxide or a resin can be used as a light diffusion particle. A transparent particle made of an inorganic oxide is, for example, silica or alumina. In addition, a transparent particle made of a resin is acrylic particle, styrene particle, styrene acrylic particle, and the cross-linked product thereof, a particle of melamine formalin condensate, PTFE (polytetrafluoroethylene), PFA (a perfluoro alkoxy resin), FEP (tetrafluoroethylene hexafluoropropylene copolymer), PVDF (a polyfluoro vinylidene), and fluorine polymer particles such as ETFE (ethylene tetrafluoroethylene copolymer), a silicone resin particle or the like. In addition, two or more kinds of transparent particles among the above particles may be combined and may be used. Further, the size or shape of a transparent particle is not especially limited.

In the case where a light diffusion particle is used as a light diffusion region, it is preferable that the thickness of the diffusion plate 7 is 0.1-5 mm. In the case where the thickness of the diffusion plate 7 is 0.1-5 mm, optimum diffusion performance and brightness can be obtained. In contrast, in the case where the thickness of the diffusion plate 7 is less than 0.1 mm, diffusion performance is insufficient. In the case where the thickness of the diffusion plate 7 is more than 5 mm, the amount of resin is too great and thereby brightness reduction becomes remarkable due to absorption, which is not preferable.

In addition, in the case where a thermoplastic resin is used as a transparent resin, bubbles may be used as a light diffusion region. Irregular reflection of light occurs by an internal surface of a bubble formed inside a thermoplastic resin and therefore a light diffusion function which is more than the same as a case where a light diffusion particle is dispersed can be realized. Therefore, the film thickness of the diffusion plate 7 can be thinner. Such a diffusion plate can be a white PET, a white PP or the like. A white PET is formed as follows. A resin being not compatible with PET or a filler such as titanic oxide ($TiO_2$), barium sulfate ($BaSO_4$) or calcium carbonate is dispersed in PET and thereafter PET is stretched by a biaxial drawing method and thereby bubbles are generated around fillers. In addition, the diffusion plate 7 made of a thermoplastic resin is formed by stretching the resin at least in a uniaxial direction. If the resin is stretched in at least one axis, bubbles can be generated around fillers.

A thermoplastic resin is, for example, as follows. polyethylene terephthalate (PET), polyethylen-2,6-naphthalate, polypropylene terephthalate, polybutyrene terephthalate, polyester system resin such as fluorene copolyester resins, cyclohexanedimethanol copolymerization polyester resin, isophthalic acid copolymerization polyester resin, spiro glycol copolymerization polyester resin, polyethylen, polypropylene, polymethylpentene, polyolefin resin such as alicyclic olefine copolymer resin, acrylic resin such as polymethyl methacrylate, polycarbonate, polystyrene, polyamide, polyether, polyester amide, poly ether ester, polyvinyl chloride, cyclo-olefin polymers, and a copolymer thereof or a mixture of these resins.

In the case where bubbles are used as a light diffusion region, it is preferable that the thickness of the diffusion plate 7 is 25-500 μm. In the case where the thickness of the diffusion plate 7 is less than 25 μm, stiffness of a sheet is insufficient and thereby wrinkles in a manufacturing process or inside a display are generated, which is not preferable. In addition, in the case where the thickness of the diffusion plate 7 is more than 500 μm, optical characteristics thereof are not especially poor, however rigidity is increased and thereby it is difficult for the plate to be rolled and it is difficult to make a slit and thus the advantage of thinness is small compared with a conventional diffusion plate, which are not preferable.

The thickness of the optical component 8 of the present invention is determined by a manufacturing process or required physical characteristics of the optical component 8 rather than the influence on optical characteristics. For example, in the case where the micro lens 14, the prism lens 15 and a micro lens as the third convex part 18 are formed on the first main surface 13a and the second main surface 13b of the base 13 by shaping using UV light, if a base thickness T of a support base film which forms the base 13 is 50 μm or less, wrinkles are generated and therefore it is necessary that 50 μm<T. Further, the thickness T of the base 13 changes according to the size of the lighting device 3 or the display device 1 to be used. For example, in the case of the display device 1 in which its diagonal size is 37 inches or more, the thickness T of the base 13 is preferably 0.05-3 mm.

Next, a method for manufacturing the optical component 8 of the present invention is explained. The micro lens 14 and the prism lens formed on the first main surface 13a of base 13 and the third convex part 18 formed on the second main surface 13b are shaped using a UV resin or a radiation curing resin on a transparent base 13. The transparent base 13 is shaped using PET (polyethylene terephthalate), PC (polycarbonate), PMMA (polymethyl methacrylate), COP (cycloolefin polymer), PAN (polyacrylonitrile copolymer), AS (acrylonitrile-styrene copolymer) or the like. On the other hand, the base 13, the micro lens 14, the prism lens formed on the first main surface 13a and the third convex part 18 formed on the second main surface 13b can be formed using one or more kinds of materials by a well known method in the art such as an extrusion method, a mold injection method or a hot-press molding. The materials used are, for example, PET (polyethylene terephthalate), PC (polycarbonate), PMMA (polymethyl methacrylate), COP (cycloolefin polymer), PAN (polyacrylonitrile copolymer), AS (acrylonitrile-styrene copolymer) or the like. In addition, in the optical component 8 of the present invention, a light reflection layer made of, for example, a white pigment can be formed on a surface of a projection part 18. Here, a white pigment is, for example, titanic oxide, aluminum oxide or barium sulfate, and is formed by a printing method or the like.

Next, functions of the display device 1 with the optical component 8 in this embodiment is explained. In FIG. 1, light emitted from a light source enters the diffusion plate 7 and is emitted as diffusion light. Thereafter, diffusion light from the light out-going surface of the diffusion plate 7 enters the optical component 8. In the optical component 8, part of the light entering the second main surface 13b of the base 13 enters a sloped side surface of the third convex part 18 and thereby is widely refracted and reflected inside the optical component 8 and is diffused and emitted over a wide angle. Therefore, this third convex part 18 can also reduce a side lobe. Here, without forming the third convex part 18, the second main surface 13b may be roughened by, for example, generally known sandblasting. Alternatively, the second main surface 13b is roughened while the third convex part 18 is formed. In addition, the light passing through the optical component 8 passes through a plurality of columnar prism lenses 15 arranged in an identical direction on the first main surface 13a of the base 13, each of columnar prism lenses having a triangle cross section, and is collected and emitted toward a front surface direction while light passes through a plurality of micro lenses 14 arranged in a random order at prism lenses 15 and is collected and emitted toward a front surface direction.

Here, in the optical component 8, TL2/TM1 is 10-90%. If a prism lens has a triangle shape cross section with an apex angle of 70-110 degrees, the light collection effect is increased and thereby high brightness is obtained while a side lobe easily occurs. However, if TL2/TM1 is within the above range, emitted light is very bright while occurrence of a side lobe of the prism lens 15 is controlled. In addition, TM1/PM1 is adjusted to be 0.4-0.9 and thereby high brightness is maintained.

Further, since Mb/Ma is adjusted to be 35-88%, a side lobe reduction ratio becomes 80-100% and thereby a side lobe can not be viewed. In addition, the third convex part 18 is formed on the second main surface of the base 13 and Mc/Ma is adjusted to be 3-10% and TM3/PM3 is adjusted to be 10-40%. Therefore, Mb/Ma can be adjusted to be 25% or more in order to maintain high brightness. In addition to this, since the micro lens 14 is arranged in a random order, moiré interference due to the prism lens 15 is not generated.

Light K passing through the optical component 8 is collected as very bright light and reaches a liquid crystal element 11 sandwiched between polarizing plates 9, 10 of a liquid crystal panel 2. Light passing through the liquid crystal panel 2 is collected and is emitted to the outside as diffusion light and is viewed by an observer wherein a viewing angle is wide. In this case, moiré interference between "the micro lens 14 and the prism lens 15" and a pixel of the liquid crystal element 11 does not occur.

In addition, an image of a lamp is reduced by the optical component 8 and the diffusion plate 7, brightness is high over the entire display, distribution of light intensity in a viewing direction is made flat while dependency of light intensity on a viewing angle is reduced. A clear image without a side lobe can be viewed by an observer wherein a viewing angle is wide.

In addition, even if other optical films are arranged on the optical component 8, scuff due to abrasion is not generated on the prism lens 15. In addition, the third convex part 18 can also improve abrasion-resistance while, even if a different optical film is arranged on a side of the second main surface 13b in order to improve optical characteristics, scuff due to abrasion is not generated on the second main surface 13b by the third convex part 18. Therefore, it is not necessary that a protective film be arranged on the first main surface 13a or the second main surface 13b of the optical component 8, and therefore material costs are reduced while handling ability when the optical component 8 is incorporated in the lighting device 3 is excellent. In addition, even if a plurality of third convex parts 18 are arranged on the second main surface 13b of the optical component 8 while an optical film or a diffusion plate having a flat light emitting surface is arranged, Newton ring due to optical contact does not occur.

In addition, according to the lighting device 3 and the display device 1 with the optical component 8, the above mentioned optical component 8 improves light collecting properties and diffusion properties of light K emitted from a lighting device. Thereby light K passes the liquid crystal panel 2 defining a display image according to transmission/shielding for every pixel unit and is diffused. Therefore, brightness is improved while dependency of light intensity on a viewing angle is reduced and distribution of a viewing angle can be smooth. Therefore, an observed image by the display device 1 is very bright and its distribution in viewing angle is smooth. In addition, a clear image of the liquid crystal panel 2 in which an image of a lamp is reduced by controlling a side lobe is obtained. In addition, moiré interference due to each pixel of the liquid crystal panel 2 is not generated.

Figure 19:
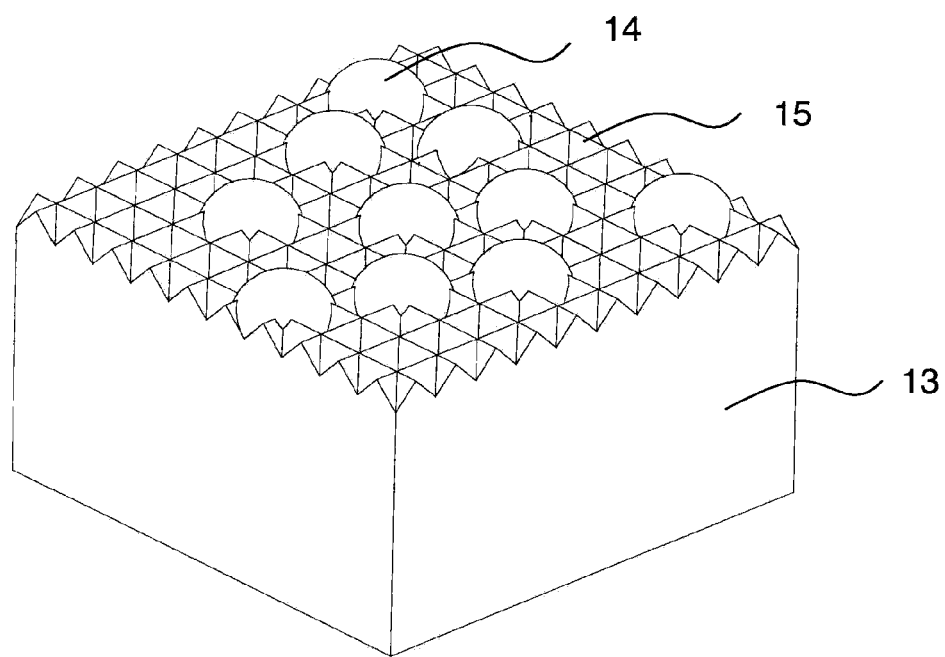
FIGS. 19-21 are perspective views showing linear lenses arranged in two directions.
Figure 20:
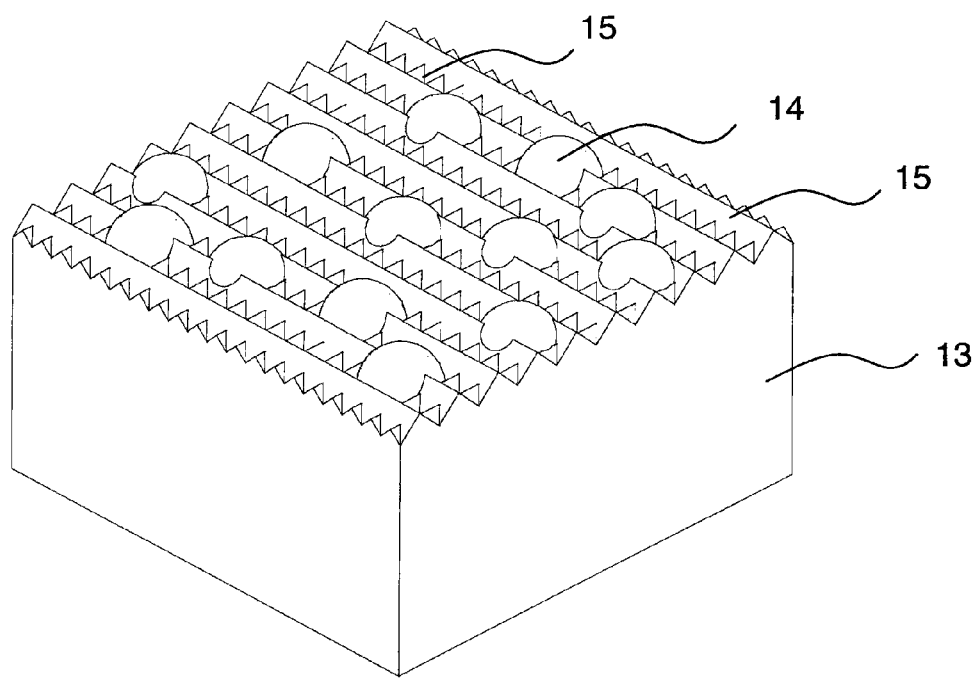
Figure 21:
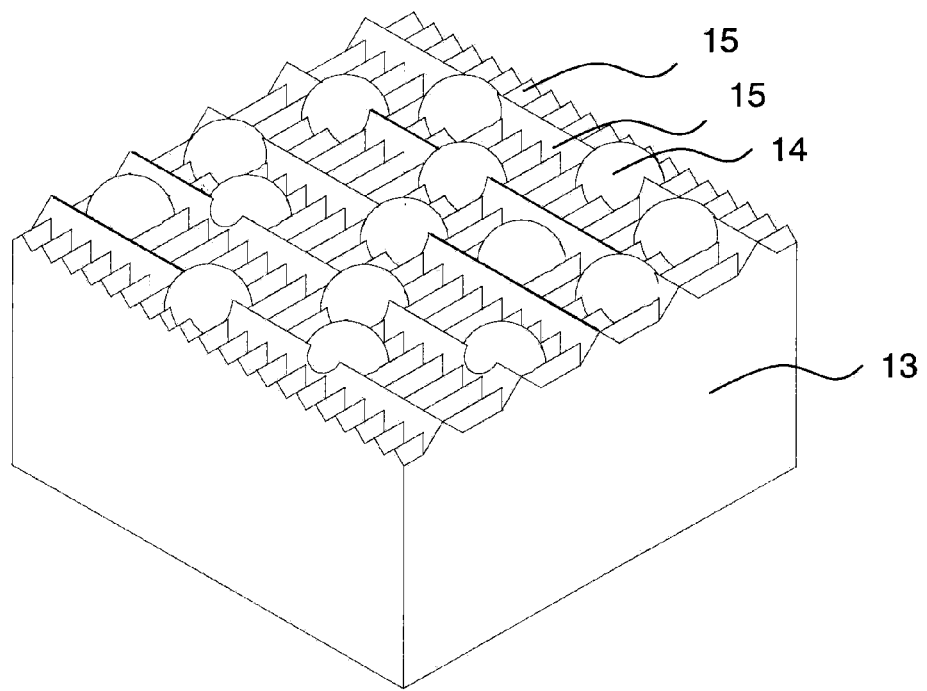

Until now, the optical component 8 of the present invention is explained using the case where component 8 is used for a liquid crystal display device. However, the present invention is not limited to this. The optical component 8 can be used for any device as long as the device performs control of a light path, for example, a rear projection screen, a solar cell, an organic or inorganic EL, a lighting device or the like. For example, the optical component 8 of the present invention can be used for a light extracting film of an organic EL lighting device. A prism lens, a pyramid lens, an inverse pyramid lens as a light extracting film of an organic EL lighting device make light intensity toward a front direction strong while color phase separation easily occurs, which is a problem. On the other hand, if a diffusion film to which a diffusion filler is applied is used as a light extracting film of an organic EL lighting device, light intensity toward a front direction becomes weak compared with the case of a prism lens, which is a problem. In the optical component 8 of the present invention, a linear lens 15 makes light intensity toward a front direction strong and color mixture occurs due to a diffusion effect of the micro lens 14 and therefore color phase separation does not occur. In particular, in the case where linear lenses 15 are arranged in two directions so as to be perpendicular to each other as shown in FIGS. 19-21, an organic EL lighting device having uniform light distribution properties from side to side and up and down is obtained. In the optical component 8 of the present invention, a ratio between the linear lens 15 and the micro lens 14 can be arbitrary selected. Therefore, in the case where light intensity is required to be increased, the micro lens 14 is reduced. In the case where color mixture is required to be strong, a micro lens is increased. Thereby, a light extracting film having a desirable property is easily obtained. In addition, a diffusion film, a prism sheet, a polarized light separating/reflecting sheet or the like may be additionally arranged in the display device 1 of the first embodiment. Thereby, image quality can be further improved. This first embodiment is explained using the lighting device 3 which is called a "direct-lit type". However, the present invention is not limited to this and can be applied to the lighting device 3 which is called an "edge light type". In the case of an edge light type lighting device 3, instead of the above diffusion plate 7, a transparent plate which is called a light guiding plate is used. Generally, a light out-going surface of a light guiding plate, that is, a surface contacting with a side of the second main surface 13b of the optical main component 8, is frequently smooth. Therefore, optical contact between a light guiding plate and the optical component 8 can be prevented due to a third convex part formed on the second main surface 13b of the optical component 8.

Figure 11:
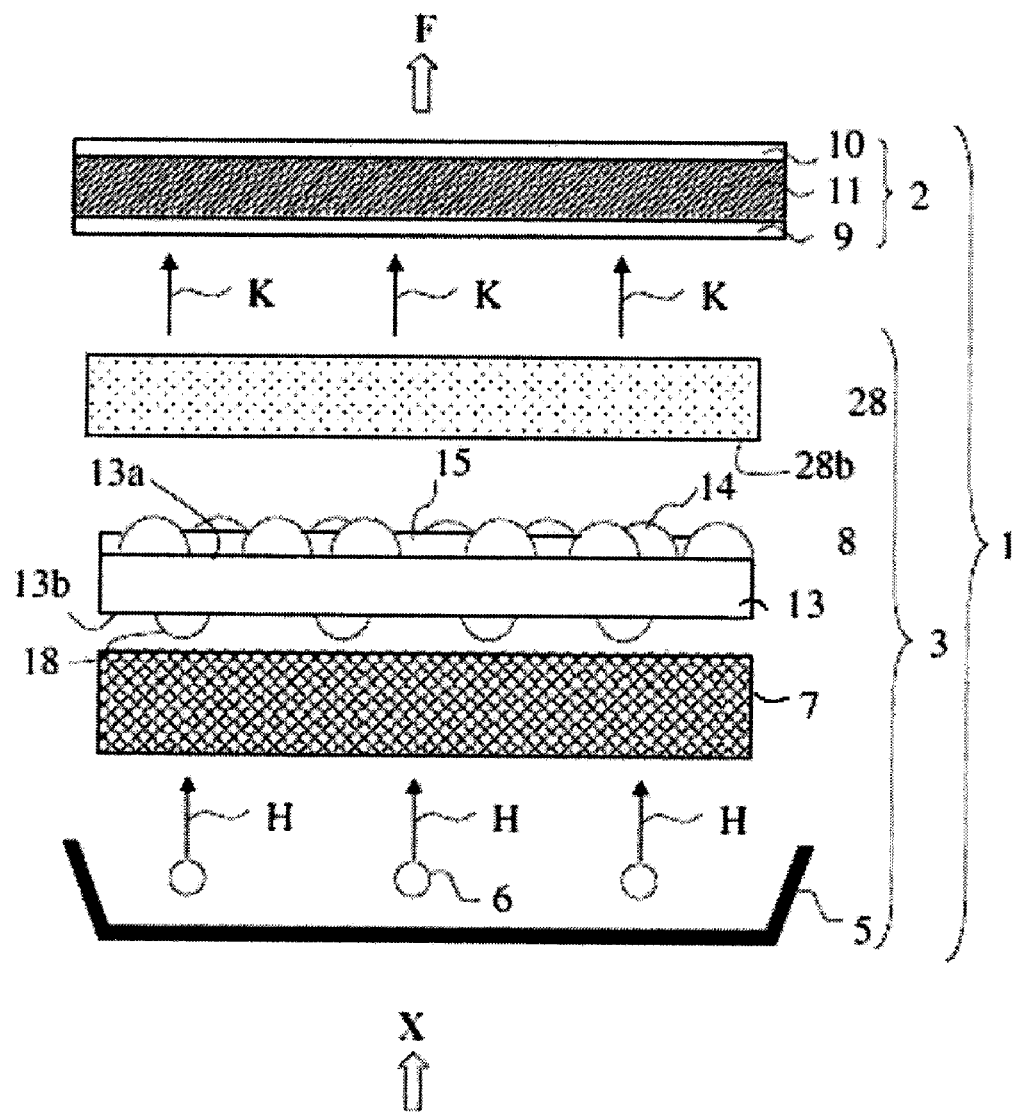
FIG. 11 is a schematic cross sectional diagram of a display device in a second embodiment of the present invention.

Next, a second embodiment of the present invention is explained. FIG. 11 is a schematic longitudinal cross-sectional view showing an example of a lighting device 3 and a display device 1 with an optical component of a second embodiment of the present invention. Here, explanation about the same or similar components or members as in the first embodiment is omitted using the same sign. An optical sheet 28 having diffusion properties is arranged between an optical component 8 of the present invention and a liquid crystal panel 2. Here, the optical sheet 28 having diffusion properties is, for example, an optical sheet which is generally called "an upper diffusion film", a polarized light separating/reflecting sheet with diffusion properties (DBEF-D, a product of 3M) or a lens sheet. A lens sheet is, for example, a micro lens sheet, a prism sheet, a lenticular lens sheet or the optical component 8 of the present invention. Further, a lower diffusion film, a micro lens sheet or the like can be appropriately selected and arranged between the optical component 8 and a diffusion plate 7.

Figure 12:
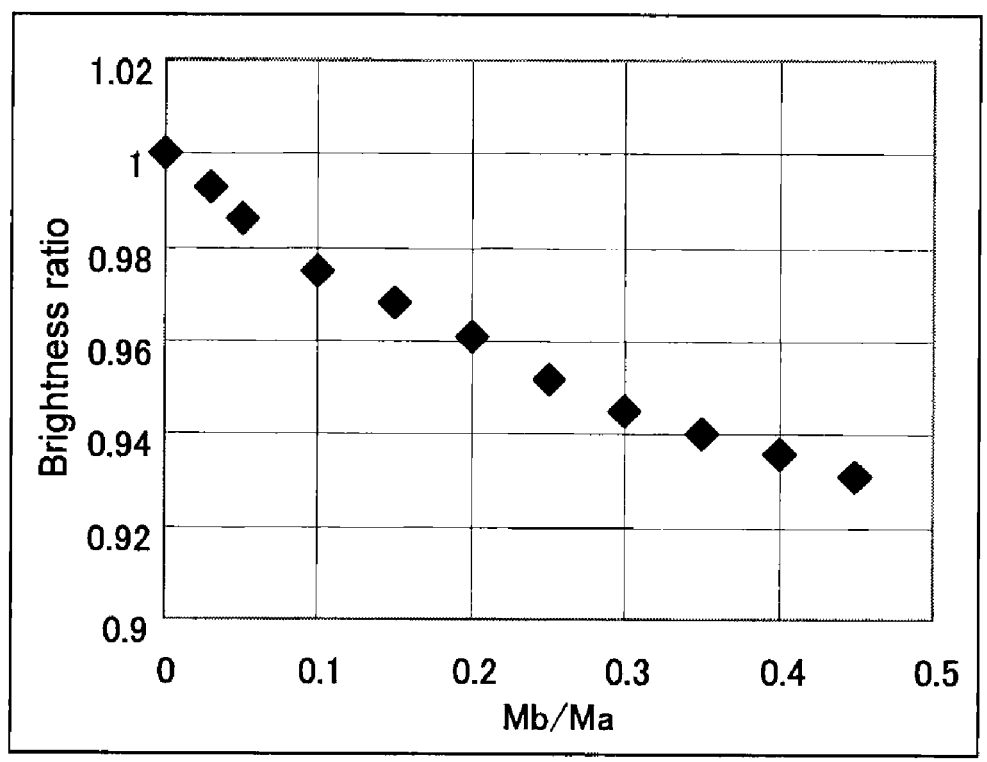
FIG. 12 is a graph showing a relationship between an area ratio of a first convex part and brightness in a second embodiment of the present invention.

In the second embodiment, the optical sheet 28 is arranged above the optical component 8 and thereby a side of a first main surface 13a of the optical component 8 contacts with a surface 28b of the optical sheet 28 in a side of the optical component 8. Thereby, an optical component is required to have abrasion-resistance against the optical sheet 28. Here, it is desirable that Mb/Ma is 3% or more, further, 3-25%. In the case where Mb/Ma is more than 25%, it is not preferable that brightness is lower than a general prism sheet (BEF, a product of 3M) by 5% or more. FIG. 12 is a graph in the second embodiment of the present invention, showing a relationship between Mb/Ma and a brightness ratio. In the structure of the lighting device 3, CCFL (Cold Cathode Fluorescent Lamp) is used as a light source 6, a lower diffusion film is arranged under the diffusion plate 7, the optical component 8 of the present invention is arranged thereon, and a polarized light separating/reflecting sheet with diffusion properties (DBEF-D, a product of 3M) is arranged as the optical sheet 28. The horizontal axis of FIG. 12 is Mb/Ma and the vertical axis is a brightness ratio. Brightness in the case where a brightness ratio is 1.0 is brightness in the case where Mb/Ma is 0, and in the case where a second convex part 15 is a prism lens 15 having an apex angle of 90 degrees, it is the same as a prism sheet. If a micro lens is increased (Mb/Ma is increased), the diffusion effect of the micro lens 14 is increased and thereby brightness to the front is reduced. If Mb/Ma is more than 25%, brightness is reduced by 5% or more compared with a case where Mb/Ma is 0% (that is a prism sheet). One object of the optical component 8 of the present invention is to improve brightness to the front direction. Therefore, such a case is not desirable. On the other hand, in an optical component of the present invention wherein Mb/Ma is 3-25%, in the case where a second convex part is the prism lens 15, in particular in the case where a prism lens has an apex angle of 90 degrees, a side lobe is generated as mentioned above. However, the optical sheet 28 having diffusion properties is arranged between the optical component 8 and the liquid crystal panel 2, and therefore a side lobe can not be viewed by a observer through the liquid crystal panel 2.

Optical and physical characteristics of the optical component 8 of the present invention are explained above. In the optical component 8 of the present invention, the micro lens 14 is arranged on the first main surface 13a as the first convex part 14. Therefore, light collecting properties can be balanced with diffusion properties. Further, in a general micro lens sheet, even in the case of a hexagonal close-packed structure, a flat surface of about 10% is generated. If a micro lens is arranged in a random order in order to prevent moiré interference, a flat surface of about 20-30% is generated. A flat surface does not have light collecting properties and diffusion properties. In the optical component 8 of the present invention, for example, the prism lens 15 is formed in a space between arranged micro lenses 14 and thereby a flat surface is not generated. Therefore, diffusion properties or light collecting properties can be provided by utilizing 10% of the first main surface 13a of the optical component 8.

Further, by adjusting TM1 higher than TL2, handling ability in an assembling process or abrasion-resistance against other optical films 28 is improved. In particular, in the case where Mb/Ma is 20% or more, a protective film which is necessary for a general lens sheet becomes unnecessary. Therefore, cost is reduced and a peeling process of a protective film is not needed. Alternatively, there is a large merit in an environmental aspect such as reduction of waste.

According to an optical component of the present invention, a micro lens is arranged on a first main surface, a lens extending in one dimension is formed in one or two directions so as to cover a space between a plurality of micro lenses. Therefore, the effect of a one dimension lens having high light collecting properties and the effect of a micro lens having both light collecting properties and diffusion properties are obtained. Therefore, an optical component in which a side lobe is hardly generated can be obtained.

The height of a one dimension lens is adjusted to be 10-90% of the height of a micro lens. Therefore, even if a one dimension lens has a sharp shape, an optical component having high abrasion-resistance is obtained.

Further, the width of a micro lens is adjusted to be 1.1-10 times as large as the width of a one dimension lens. Therefore, a one dimension lens always overlaps with a micro lens. If one or more of the one dimension lenses overlaps with a micro lens, light collecting properties of the one dimension lens and light collecting properties/diffusion properties of a micro lens easily become uniform. Thereby an optical component in which local non-uniformity of brightness does not occur can be obtained.

In addition, a micro lens with an aspect ratio of 10-50% is formed on a second main surface so that an area of the micro lens is 3-10% of an area of a second main surface. Therefore, optical characteristics of an optical component of the present invention can be adjusted. That is, in the case where a second main surface is a flat surface, a range of angle of light advancing inside an optical component, the light entering from a second main surface, is limited by a refractive index of the optical component. However, if a micro lens is formed on a second main surface, it becomes possible that a range of angle of light advancing inside the optical component is broadened. Optical characteristics which an optical component does not inherently have can be obtained.

In addition, a micro lens formed on a first main surface and a micro lens formed on a second main surface are irregularly arranged. Therefore, moiré interference due to a one dimension lens does not occur.

A lighting device can be provided, the device being very bright wherein local non-uniformity is small, by using an optical component having the above effects.

Further, a high definition display device of high brightness without non-uniformity can be provided by using such a lighting device as a surface light source illuminating an image display element.

EXAMPLE

Hereinafter, an optical component 8 of an example of the present invention is explained in detail. In addition, of course, the present invention is not limited to the examples.

Example 1

An optical component 8 in the examples is as follows. A base 13 was formed using a PET film of 250 μm. A micro lens 14 and a prism lens 15 comprised of a triangle prism having an apex angle of 90 degrees were formed on a first main surface 13a of the base 13. A diameter PM1 of the micro lens 14 was 100 μm and a height TM1 of the micro lens 14 was 48 μm. This micro lens 14 was arranged in a random order inside a surface of the main surface 13a of the base 13 and samples having area ratios of 0-50% at 5% intervals (0%, 5%, 10%, 15%, 20%, 25%, 30%, 35%, 40%, 45% and 50%) were prepared. On the other hand, the prism lens 15 having the apex angle of 90 degrees was as follows: a prism pitch PL2 was 30 μm; a height TL2 was 15 μm; and a plurality of the prism lenses were arranged in one direction, the prism lenses being parallel to each other. As a result, an aspect ratio of heights of the prism lens 14 and the micro lens 15 TL2/TM1 was 31.3%.

Example 2

As a different example, an optical component 8 was prepared by an extrusion method using a material of polycarbonate. A micro lens 14 and a prism lens 15 comprised of a triangle prism having an apex angle of 90 degrees were formed on a first main surface 13a. The micro lens 14 was as follows: a diameter PM1 was 100 μm and a height TM1 was 48 μm. This micro lens 14 was arranged in a random order inside a surface of the main surface 13a and samples having area ratios of 0-50% at 5% intervals (0%, 5%, 10%, 15%, 20%, 25%, 30%, 35%, 40%, 45% and 50%) were prepared. On the other hand, the prism lens 15 having the apex angle of 90 degrees was as follows: a prism pitch PL2 was 30 μm; a height TL2 was 15 μm and a plurality of the prism lenses were arranged in one direction, the prism lenses being parallel to each other. As a result, an aspect ratio of heights of the prism lens 14 and the micro lens 15 TL2/TM1 was 31.3%. On the other hand, a micro lens 18 having a diameter PM3 of 100 μm and a height of 20 μm was formed on a second main surface as a third convex part 18. The micro lenses 18 were arranged in a random order inside a surface of the second main surface 13b and its area ratio Mc/Ma was 5%.

Figure 13:
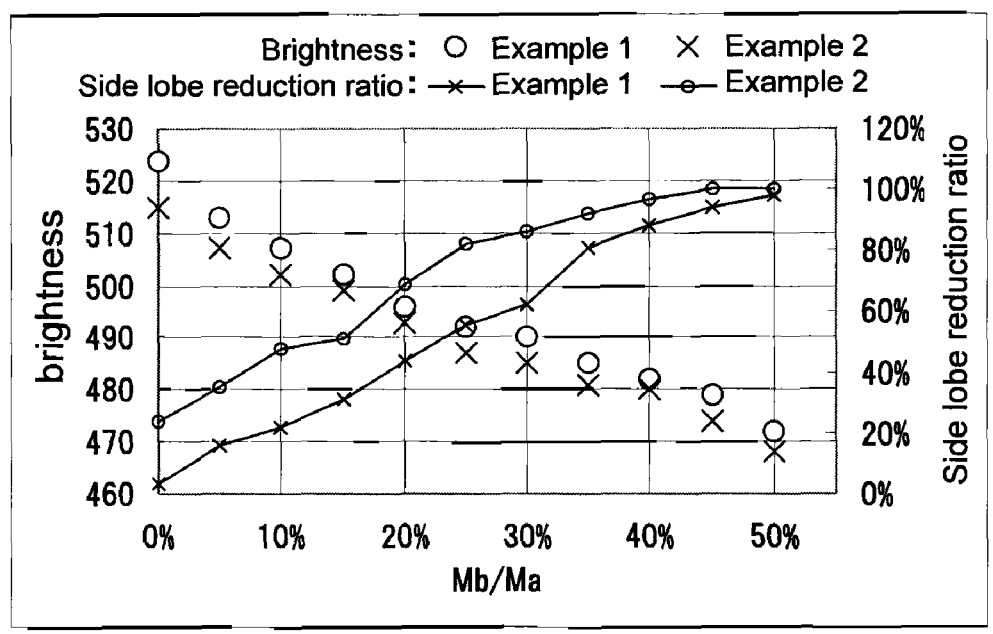
FIG. 13 is a graph showing brightness and a side lobe reduction ratio in the Examples.

The optical components 8 in the examples prepared as mentioned above were arranged in a liquid crystal television 1 of 32 inches. A backlight of the liquid crystal display was comprised only of a diffusion plate 7 made of polystyrene and the optical component 8 of each of the examples. In a liquid crystal panel 2, a white screen was displayed and brightness at a center of the screen of the liquid crystal panel 2 was measured by a spectral radiance meter (SR-3A, a product of TOPCON). On the other hand, a side lobe reduction ratio was measured in a state of a lighting device 3 in order to remove influence of diffusion by the liquid crystal panel 2 or influence of attenuation of a wide viewing angle light. In the measurement, a light distribution meter (EZContrast, a product of ELDIM) was used, a light distribution of the center of the lighting device was measured and a side lobe reduction ratio was calculated. The results are shown in FIG. 13.

A refractive index of the resin in Example 1 was different from a refractive index of the resin in Example 2. (the refractive index of the UV curable resin used in Example 1 was 1.53; and the refractive index of the polycarbonate resin used in Example 2 was 1.58.) Therefore, it was necessary to consider the difference for evaluation. From FIG. 13, brightness and a side lobe reduction with respect to an area ratio Mb/Ma were confirmed. In Example 1, in the case where Mb/Ma was 35% or more, a side reduction ratio was more than 80%. On the other hand, in Example 2, the third convex part 18 was formed on the second main surface 13b. Therefore, brightness in Example 2 was lower than brightness in Example 1. However, in the case where Mb/Ma was 25% or more, a side lobe reduction rate was more than 80%. Further, in the display device 1, brightness in the case where Mb/Ma was 25% in Example 2 was higher than brightness in the case where Mb/Ma was 35%.

Figure 14:
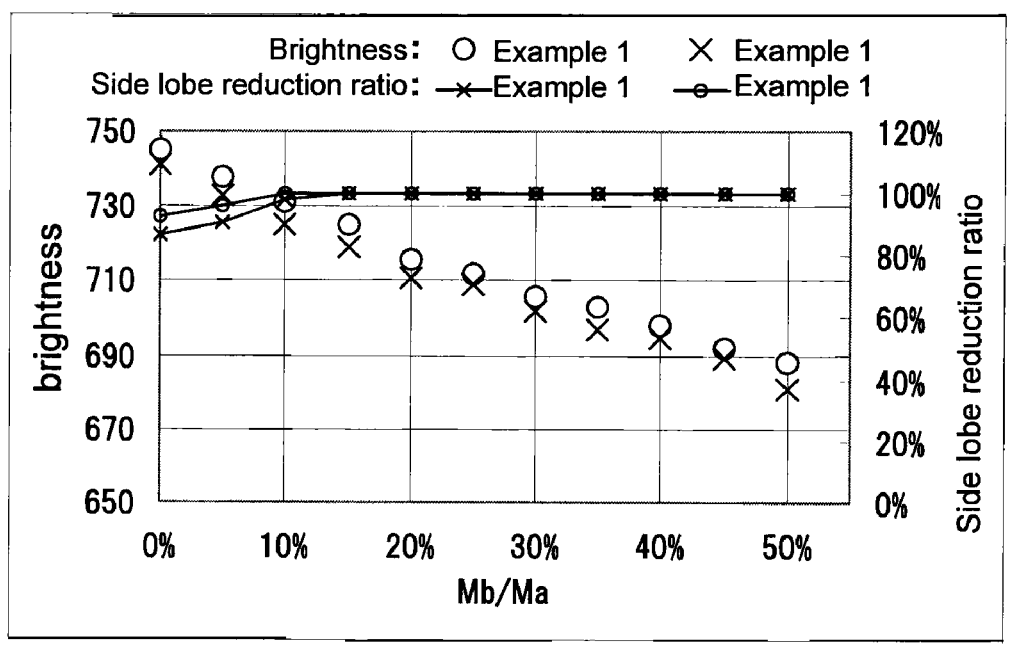
FIG. 14 is a graph showing brightness and a side lobe reduction ratio in the Examples.
Figure 15:
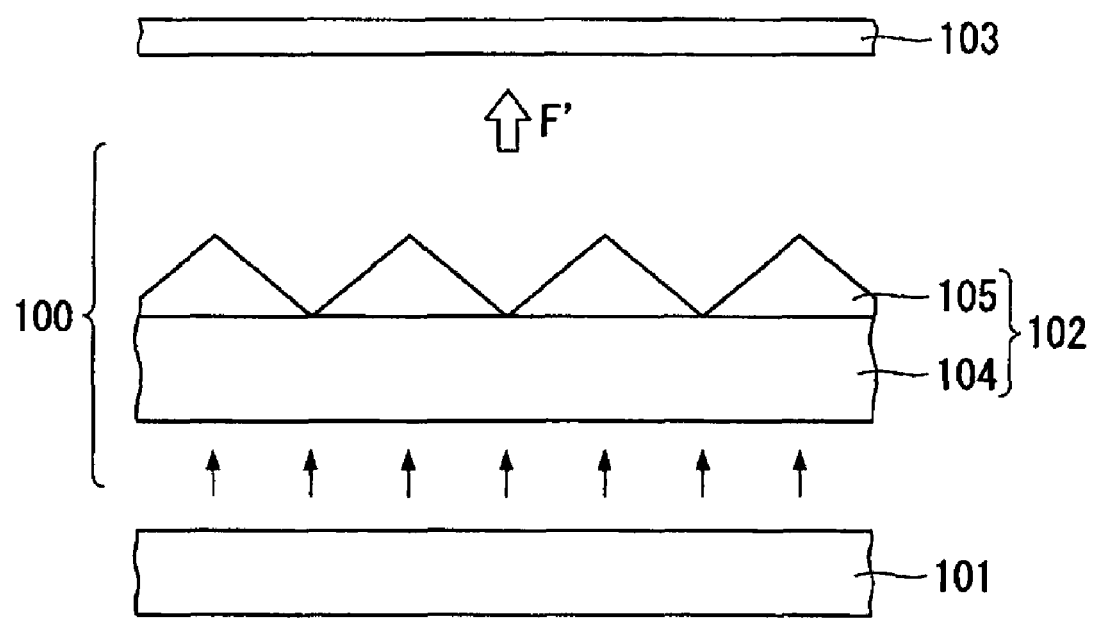
FIG. 15 is a schematic cross sectional diagram of a display device using a BEF in a conventional example.

Next, the optical components 8 prepared in the Examples were arranged in the 32 inch liquid crystal televisions 1. A lower diffusion film was arranged above a diffusion plate 7 made of polystyrene and the optical component 8 of Example was arranged in the backlight of the liquid crystal television. Further, DBEF-D (a product of 3M) was arranged above the optical component 8 as an optical sheet 28 and the same measurement as mentioned above was performed. The results are shown in FIG. 14.

In both the optical components 8 in Examples 1 and 2, even in an optical component having low Mb/Ma of 0-35%, a side lobe reduction rate was more than 80%. A display device 1 without side lobe problems was obtained.

Then, abrasion-resistance between an optical component 8 of the Example and DBEF-D was measured. A RUBBING TESTER (a product of TESTER SANGYO) was used as an evaluation apparatus. The evaluation method was as follows. An optical component 8 of the present invention was arranged on a stage and DBEF-D was arranged on the optical component 8. In this state, pressure was applied and the stage was moved back and forth 10 times at a speed of 120 mm/s. The pressure was 150 g or 450 g. As a result, in an optical component 8 having Mb/Ma of 5% or more, scuff due to friction was not formed when pressure was both 150 g and 450 g. On the other hand, in an optical component 8 having Mb/Ma of 0%, the top of the prism lens 15 was ground in the case where pressure was 150 g, From the above Examples, an optical component 8 in which a side lobe is not generated at high brightness and scuff due to friction was not formed if an optical sheet 8 was arranged thereon can be obtained. A lighting device 3 with the optical component and a display device 3 with the optical component can be obtained.

What is claimed is:

1. An optical component, comprising:
    a first main surface and a second main surface;
    wherein
    a plurality of two-dimensionally arranged first convex parts are arranged on the first main surface, the first convex parts being independent of each other and irregularly arranged, each of the first convex parts being a micro lens having an approximately semispherical shape or an approximately elliptical semispherical shape or an aspherical shape having a rounded tip;
    an aspect ratio TM1/PM1 of each of the first convex parts is at least 40% wherein a height of each of the first convex parts is defined as TM1 and a diameter of each of the first convex parts is defined as PM1;
    a plurality of second convex parts arranged on the first main surface, each of the second convex parts having a height less than that of each of the first convex parts, each of the second convex parts comprising a lens extending in a one dimensional direction, the lens being arranged in one or two directions;
    a width of each of the first convex parts in contact with the first main surface is from 1.1 to 10 times as large as a width of each of the second convex parts;
    and
    an area ratio Mb/Ma is equal to or greater than 50% and equal to or lower than 88% wherein an area of the first main surface is defined as Ma and a total area of the first convex parts is defined as Mb.

2. The optical component according to claim 1, wherein the height of the second convex parts is from 10 to 90% of the height of the first convex parts.

3. The optical component according to claim 1, wherein the first convex parts are irregularly arranged on the first main surface, and wherein total areas of the first convex parts in contact with the first main surface per unit area of the first main surface are approximately constant with respect to location on the first main surface, wherein the first convex parts are included in the unit areas of the first main surface.

4. The optical component according to claim 1, wherein the aspect ratio TM1/PM1 is equal to or greater than 40% and equal to or less than 90%.

5. A lighting device, comprising:
    the optical component according to claim 1; and
    a light source irradiating the optical component from a side of the second main surface.

6. A display device, comprising:
    an image display device which determines a display image according to transmission or shielding of light for a pixel unit; and
    the lighting device according to claim 5.

* * * * *